(12) United States Patent
Sarkkinen et al.

(10) Patent No.: US 6,950,420 B2
(45) Date of Patent: Sep. 27, 2005

(54) TRANSMISSION OF THE FIXED SIZE PDUS THROUGH THE TRANSPARENT RLC

(75) Inventors: Sinikka Sarkkinen, Kangasala (FI); Juha Mikola, Helsinki (FI); Mikko J. Rinne, Helsinki (FI)

(73) Assignee: Nokia Mobile Phones, Ltd., Espoo (FI)

( * ) Notice: Subject to any disclaimer, the term of this patent is extended or adjusted under 35 U.S.C. 154(b) by 922 days.

(21) Appl. No.: 09/821,788

(22) Filed: Mar. 29, 2001

(65) Prior Publication Data

US 2001/0033582 A1 Oct. 25, 2001

Related U.S. Application Data

(60) Provisional application No. 60/195,676, filed on Apr. 7, 2000.

(51) Int. Cl.[7] .............................. H04Q 7/24; H04J 3/24
(52) U.S. Cl. ....................................... 370/338; 370/474
(58) Field of Search ............................... 370/328, 338, 370/401, 465, 473, 474, 398

(56) References Cited

U.S. PATENT DOCUMENTS

| | | | | |
|---|---|---|---|---|
| 5,930,265 A | * | 7/1999 | Duault et al. ............... | 370/473 |
| 6,021,333 A | | 2/2000 | Anderson et al. | |
| 6,094,575 A | | 7/2000 | Anderson et al. | |
| 6,108,336 A | * | 8/2000 | Duault et al. ............. | 370/395.6 |
| 6,122,293 A | | 9/2000 | Frodigh et al. | |
| 6,301,479 B1 | * | 10/2001 | Roobol et al. .............. | 455/436 |
| 6,374,112 B1 | * | 4/2002 | Widegren et al. ........ | 455/452.2 |
| 6,674,733 B1 | * | 1/2004 | Huusko ...................... | 370/329 |
| 6,675,016 B2 | * | 1/2004 | Lucidarme et al. ...... | 455/452.2 |
| 6,711,141 B1 | * | 3/2004 | Rinne et al. ................ | 370/328 |
| 2001/0025321 A1 | | 9/2001 | Tang et al. | |

FOREIGN PATENT DOCUMENTS

| | | |
|---|---|---|
| WO | 9713353 | 4/1997 |
| WO | 9941872 | 8/1999 |
| WO | 9963703 | 12/1999 |
| WO | 0021253 | 4/2000 |
| WO | 0137507 | 5/2001 |
| WO | 0161897 | 8/2001 |

OTHER PUBLICATIONS

3G TR 23.910 v 3.0.0 (Mar. 2000); 3rd Generation Partnership Project; Technical Specification Group Core Network; Circuit Switched Data Bearer Services (Release 1999).
3G TR 25.926 v 3.0.0 (Mar. 2000); 3rd Generation Partnership Project; Technical Specification Group Radio Access Network; UE Radio Access Capabilities (Release 1999).
3G TS 25.331 v 3.2.0 (Mar. 2000); 3rd Generation Partnership Project; Technical Specification Group Radio Access Network; RRC Protocol Specification (Release 1999).
3G TS 25.415 v 3.2.0 (Mar. 2000); 3rd Generation Partnership Project; Technical Specification Group Radio Access Network; UTRAN Iu Interface User Plane Protocols (Release 1999).
3G TS 25.302 v 3.4.0 (Mar. 2000); 3rd Generation Partnership Project; Technical Specification Group Radio Access Network; Services Provided by the Physical Layer (Release 1999).
3G TS 25.322 v 3.2.0 (Mar. 2000); 3rd Generation Partnership Project; Technical Specification Group Radio Access Network; RLC Protocol Specification (Release 1999).
"ATM Transport in Cellular Networks" by G. Eneroth et al ISS '97. World Telecommunications Congress. (International Switching Symposium). vol. 2, Sep. 21, 1997, pp. 139–146.

\* cited by examiner

Primary Examiner—Chau Nguyen
Assistant Examiner—Andrew Wahba

(57) ABSTRACT

Active and inactive segmentation states are defined for transparent mode for a radio access network (RAN) interfacing with a core network (CN) and a user equipment (UE). If transparent mode is valid on the Iu-interface between the RAN and the CN, then an inactive segmentation state indicates to peer (UE/RAN) segmentation and reassembly (SAR) entities such as at the radio link control (RLC) layer that segmentation is blocked in the UTRAN, over the Uu-interface, and in the UE so that TTIs with periodicities greater than the minimum transmission interval may be utilized, except over said Iu-interface.

18 Claims, 19 Drawing Sheets

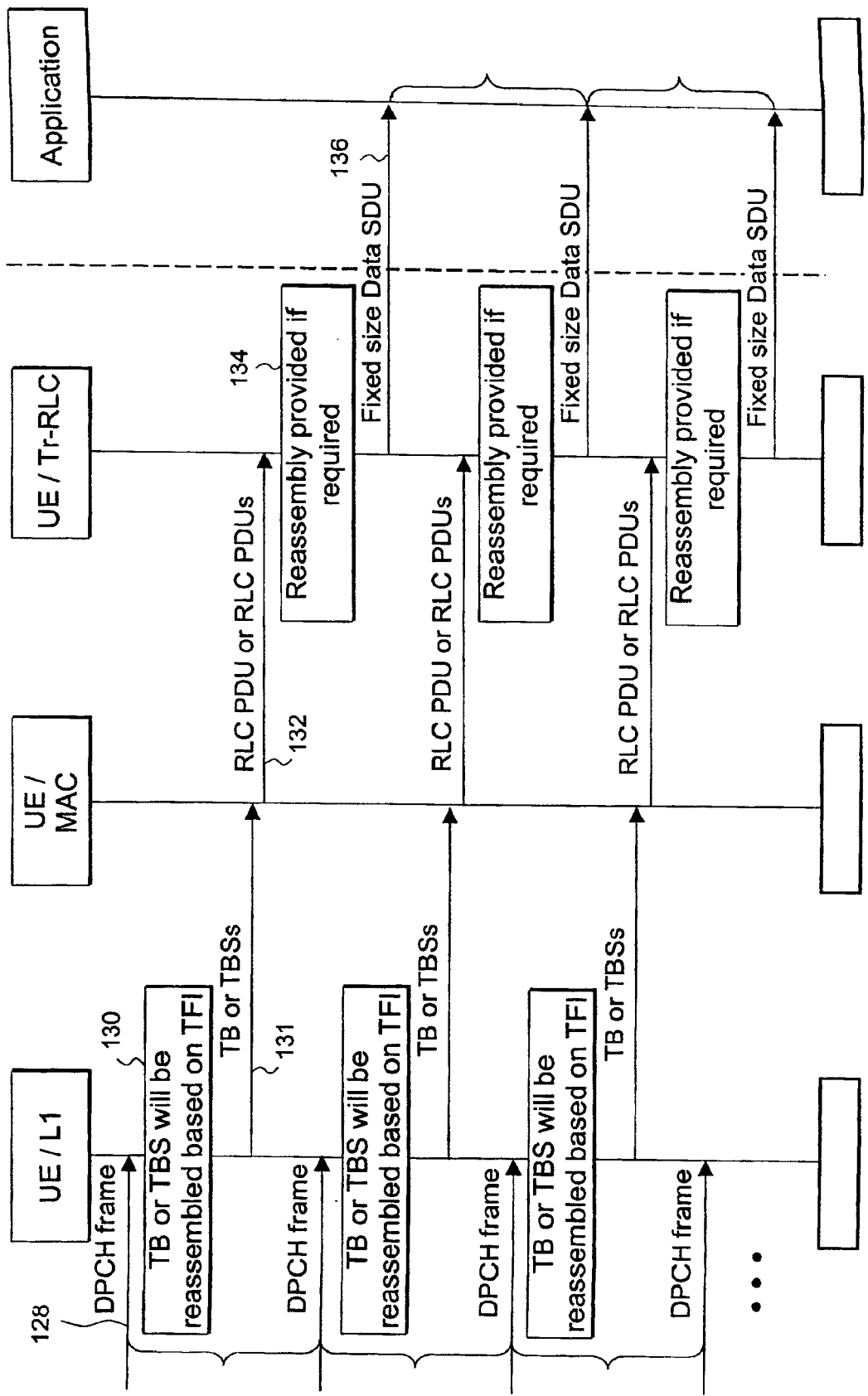

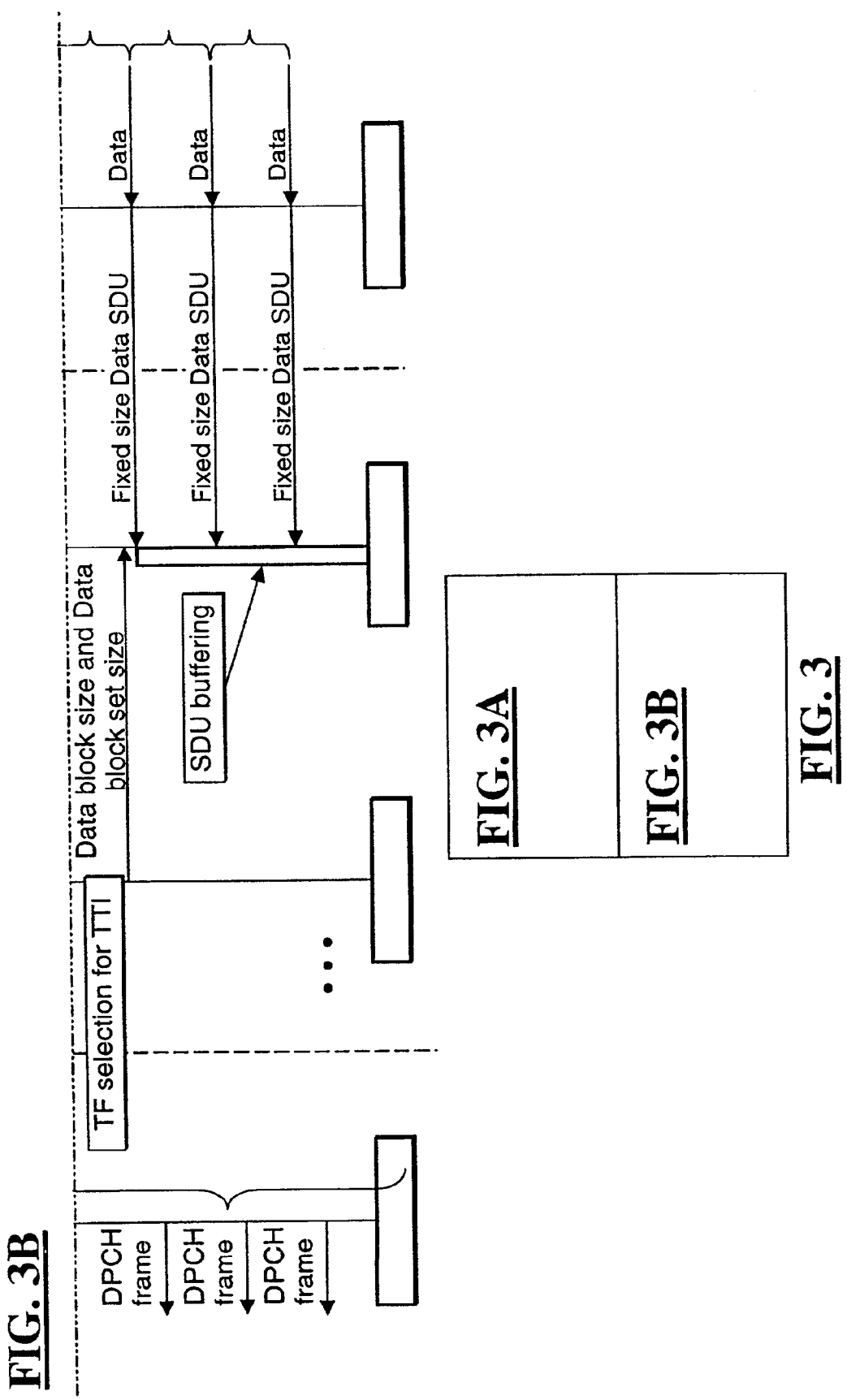

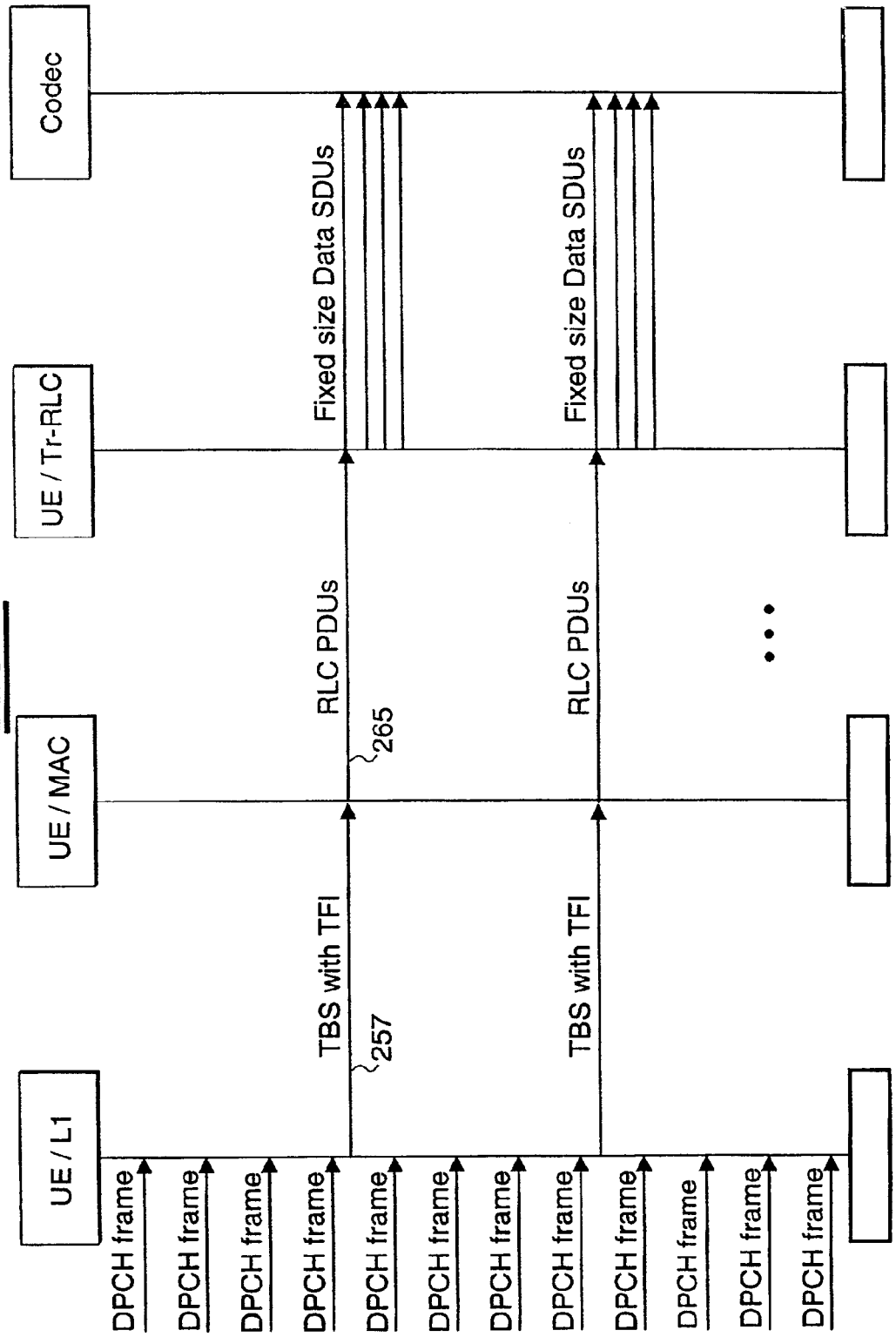

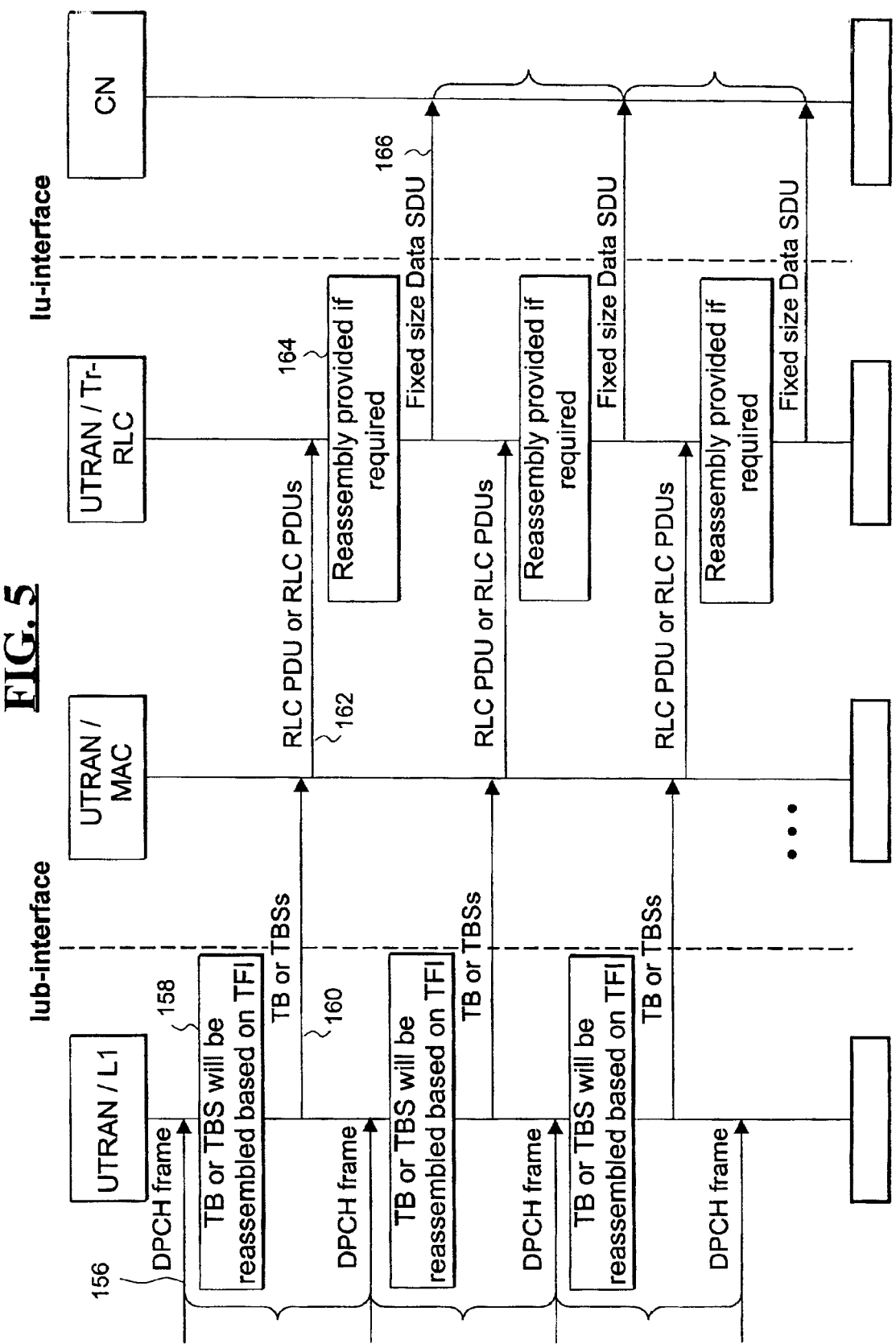

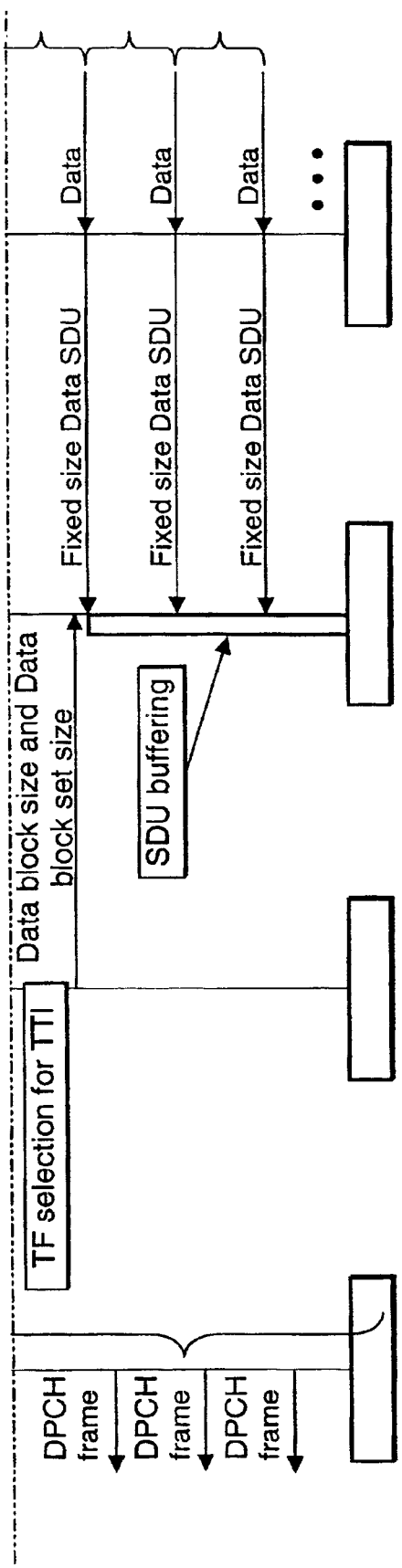

TRANSMISSION OF THE FIXED SIZE PDUS THROUGH THE TRANSPARENT RLC

This application claims benefit of U.S. application Ser. No. 60/195,676 filed Apr. 7, 2000.

BACKGROUND OF THE INVENTION

Referring to FIG. 9, the Universal Mobile Telecommunications System (UMTS) packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network over an Iu interface. FIG. 10 shows some further details of the overall architecture. The Iu protocol includes a user plane (UP) protocol as shown in FIG. 11. A user plane protocol implements the actual radio access bearer service, i.e., carrying user data through the access stratum. Another way of looking at the user plane protocol is shown in FIG. 12. It is distinguished from the control plane protocol of FIG. 13 that controls the radio access bearers and the connection between the UE and the network from different aspects (including requesting the service, controlling different transmission resources, handover and streamlining, transfer of NAS messages, etc). See 3G TS 25.401 §5.

An objective of having the Iu User Plane (UP) protocol is to remain independent of the CN domain (Circuit-Switched or Packet-Switched) and to have limited or no dependency with the Transport Network Layer (TNL). Meeting this objective provides the flexibility to evolve services regardless of the CN domain and to migrate services across CN domains. The Iu UP protocol is therefore defined with modes of operation that can be activated on a Radio Access Bearer (RAB) basis, rather than on a CN domain basis or (tele) service basis. The Iu UP mode of operation determines if and which set of features shall be provided to meet, e.g., the RAB QoS requirements.

The modes of operation of the UP protocol are defined (3G TS 24.415 §4.2.1) as (1) Transparent Mode (TrM), and (2) Support Mode for predefined SDU size (SMpSDU). Determination of the Iu UP protocol instance mode of operation is a CN decision taken at RAB establishment based on, e.g., the RAB characteristics. It is signaled to the Radio Network Layer (RNL) control plane at RAB assignment and relocation for each RAB. It is internally indicated to the Iu UP protocol layer at user plane establishment. The choice of a mode is bound to the nature of the associated RAB and cannot be changed unless the RAB is changed.

The transparent mode is intended for those RABs that do not require any particular feature from the Iu UP protocol other than transfer of user data. The Iu UP protocol layer in transparent mode over the Iu interface is illustrated in FIG. 2 of 3G TSG RAN: "UTRAN Iu Interface User Plane Protocols (Release 1999)", TS 25.415 v 3.2.0 (2000–03). In this mode, the Iu UP protocol instance does not perform any Iu UP protocol information exchange with its peer over the Iu interface: no Iu frame is sent. The Iu UP protocol layer is crossed through by PDUs being exchanged between upper layers and transport network layer. Operation of the Iu UP in transparent mode is further discussed in Section 5 of 3G TSG RAN 25.415 v 3.2.0 (2000–03).

For transport of the user data, it is known from 3G TSG RAN: "Services Provided by the Physical Layer" 3G TS 25.302 v 3.3.0 (2000–01) that a Transmission Time Interval (TTI) is defined as the inter-arrival time of Transport Block Sets (TBSs), and is equal to the periodicity at which a TBS is transferred by the physical layer on the radio interface. It is always a multiple of the minimum interleaving period (e.g., 10 ms, the length of one Radio Frame). The MAC delivers one TBS to the physical layer every TTI. Furthermore, plural TBSs may be exchanged at certain time instances between MAC and L1 by parallel transport channels existing between a UE and the UTRAN. Each TBS consists of a number of Transport Blocks (although a single Transport Block can be sent in a TTI as well). The TTI, i.e., the time between consecutive deliveries of data between MAC and L1, can vary, for instance 10 ms, 20 ms, 40 ms, 80 ms between the different channels. Moreover, the number of transport blocks and the transport block sizes can also vary, even within a channel. Therefore, the UTRAN is able to operate in this manner, and it would be advantageous to be able to continue to operate in this manner within the UTRAN because of its inherent flexibility, even if the Iu-interface between the UTRAN and the CN may be defined differently. There is, in fact, a conflict between emerging standards that creates a problem in this regard.

The current TSG RAN TS 25.322 RLC (Radio Link Control) protocol specification defines such functions as segmentation and buffering for the Transparent RLC. The use of buffering on the RLC layer is mainly an implementation issue, but segmentation has been defined in such a way that it is to be performed according to a predefined pattern. This pattern defines that all RLC Protocol Data Units (PDUs) carrying one RLC Service Data Unit (SDU) shall be sent in one TTI (i.e., the segments shall all be carried in one TTI) and only one RLC SDU can be segmented in one TTI (see Section 9.2.2.9).

This definition is useful when the size of the SDU is fixed and the TTI on the Iu-interface and in UTRAN are defined to be equal. Consequently, the above-mentioned definition makes Transparent RLC useful basically only for certain CS services in which the SDU size is either equal to the size of a TB (transport block) or it is always modulo 0 of the TB. Therefore the mode used on the Iu-interface should normally be the above-mentioned Support mode for predefined SDU size (SMpSDU), which allows use of a Rate Control procedure to change the size of the SDU within a valid RAB sub Flow Combination (RFC), but not a valid TTI on the Iu-interface. This kind of CS service, which uses the services of the transparent RLC in this form is, e.g., AMR codec speech.

However the current 3GPP TSG CN TR 23.910: "Circuit Switched Data Bearer Services" defines also such CS data services, in which
- the payload consists of user data bits only (i.e., no header has been added into the data stream).
- use only transparent mode on the Iu-interface (i.e., no control frames have been defined for the Iu User Plane mode and therefore it is not possible to perform Rate Control during the data transmission).
- the payload (SDU) size is fixed (i.e., there is an association between the SDU size and the bit rate on the IuBinterface).
- always use a 10 ms TTI on the Iu-interface.
- the CS data services are defined to support Conversational traffic class in UTRAN.
- the CS data services always use the services of the transparent RLC in UTRAN.

The characteristics listed above justify the use of the transparent RLC in UTRAN, however they are not in line with 3GPP TSG RAN TS 25.322 specifying the RLC Protocol and 3GPP TSG RAN TR 25.926 specifying the UE capability. The current RLC protocol specification (TS 25.322) doesn't restrict the use of any TTIs (defined in 3GPP TSG RAN TS 25.302) during the data transmission from a transparent RLC entity to a peer entity layer through UTRAN. In other words, although only one SDU is allowed to be segmented and transported in one TTI, the periodicity of the TTI is not restricted to 10 ms by the RLC protocol specification.

Thus the contradiction between the UE capability document and the Circuit Switched Data Bearer Services document is the manner in which the TTI is used for Conversational traffic class. The UE capability document 3G TSG RAN: "UE Radio Access Capabilities" (3G TR 25.296) presents the reference RABs at Table 6.1 thereof, which includes a Conversational Reference TTI of 40 ms for 64 kbps. At this time the actual value of the TTI is not important. The more important issue is that the idea to use other than 10 ms in UTRAN has been presented for this traffic class.

So the main problem is how to map data received from the Iu-interface, e.g., every 10 ms, to the valid TTI, when the TTI used in UTRAN (TTIs of various periodicities) is different from the transmission interval used on the Iu interface (10 ms).

DISCLOSURE OF INVENTION

This invention describes how the current contradiction between the RLC, UE capability and CS Data Bearer Service definitions can be solved by updating the description of the transparent RLC. The solution is useable generally at any segmentation and reassembly (SAR) layer, not just the RLC layer described herein.

The invention is to introduce the concept of using two segmentation states for transparent mode (TrM): an active segmentation state (i.e., segmentation is ON) and an inactive segmentation state (i.e., segmentation is OFF). The active Segmentation State corresponds the description of current RLC, which has already been defined for the transparent RLC. Therefore no change to describe this state is required.

The basic idea of the inactive segmentation state is to deny the use of segmentation on the RLC entity for user data. When the segmentation has been denied the transparent RLC entity may send more than one SDU upon one TTI based on the value of the Transport Format (TF) defined for the TTI. See §7.1.6 of 3G TS 25.302 "Services provided by the Physical Layer" for a definition of Transport Format. The SDUs are placed in the TBS in the same order as they were delivered from a higher layer. This change allows the RLC entity to support the transmission interval mapping with the aid of RLC layer buffering even if the RLC mode used is transparent mode.

This state can be defined by RRC during the radio bearer (RB) setup procedure, and this information is given to the peer RLC entity inside the RLC info (see §10.3.4.18 of 3G TS 25.331 "RRC Protocol Specification"), wherein a new one-bit "Segmentation State Indication" field is required to be added, according to the present invention. This field in the RRC message defines whether the segmentation is supported or not on transparent RLC for the corresponding RB. This method is applicable for both Time Division Duplex (TDD) and Frequency Division Duplex (FDD) modes.

This invention solves the contradiction between the 3GPP TSG RAN TS 25.322, 3GPP TSG RAN TR 25.926 and 3GPP TSG CN TR 23.910. It also allows to use different transmission intervals on Iu-interfaces and in UTRAN in order to support the transmission interval mapping with the aid of RLC buffering, which already has been defined for the transparent RLC.

The main advantages of this invention are:

(1) In transparent mode more than one SDU is allowed to be sent within one TTI. The number of SDUs will be given in the TF defined for the TTI.

(2) The mapping between the transmission intervals supported by Iu-interface and UTRAN can be supported with the aid of buffering on the transparent RLC layer.

(3) The valid TTI for UTRAN can be defined based on information from the Radio interface, and there need not be any such definition restricted on the basis of the sole supported transmission interval (e.g., 10 ms) on the IuBinterface.

(4) This method allows the use of the other TTIs in UTRAN than 10 ms.

(5) It is possible to use a dynamic TTI in UTRAN in TDD mode.

(6) CS data, which uses transparent data services on the Iu interface, can be sent through UTRAN without adding any overhead on the RLC layer, i.e., the air interface is used more efficiently.

(7) This method adds flexibility to the use of transparent RLC mode.

BRIEF DESCRIPTION OF THE DRAWINGS

FIG. 2 shows a flowchart for downlink data transmission in the active segmentation state at the UE.

FIG. 3 shows how FIGS. 3A and 3B fit together.

FIGS. 3A and 3B together show a flowchart for downlink data transmission in an inactive segmentation state at the UTRAN.

FIG. 4 shows a flowchart for downlink data transmission in the inactive segmentation state at the UE.

FIG. 5 shows a flowchart for uplink data transmission in an active segmentation state at the UTRAN.

FIG. 8 shows how FIGS. 8A and 8B fit together.

FIGS. 8A and 8B together show a flowchart for uplink data transmission in the inactive segmentation state at the UE.

BEST MODE FOR CARRYING OUT THE INVENTION

Figure 13:
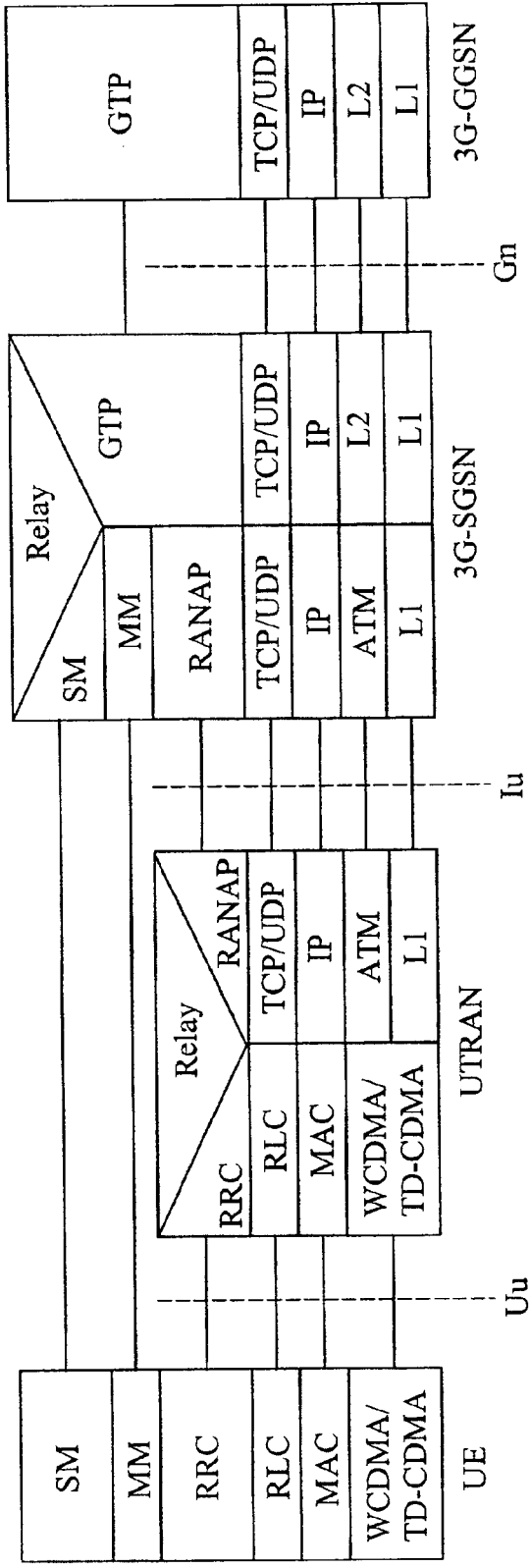
FIG. 13 shows a comparable control plane protocol stack for the UMTS.

Normally the UE will activate a connection establishment request (ACTIVATE_PDP_CONTEXT_REQUEST) to the 3G-SGSN of FIG. 13 by requesting an IP Address (PDP_Address) and that inter alia a certain QoS be associated with the connection. The 3G-SGSN responds by sending a request (RAB_ASSIGNMENT_REQUEST) to the UTRAN to establish a Radio Access Bearer (RAB) to carry out the request. An RAB setup procedure is then carried out at the UTRAN between the RANAP and the RRC and once competed the RAB assignment of QoS profile and bearer ID are signaled (RAE_ASSIGNMENT_COMPLETE) back to the 3G-SGSN with QoS profile and bearer ID. The connection setup is then completed at the 3G-GGSN and signaled back to the UE via the 3G-SGSN with IP Address, QoS, Bearer ID and other information.

Figure 14:
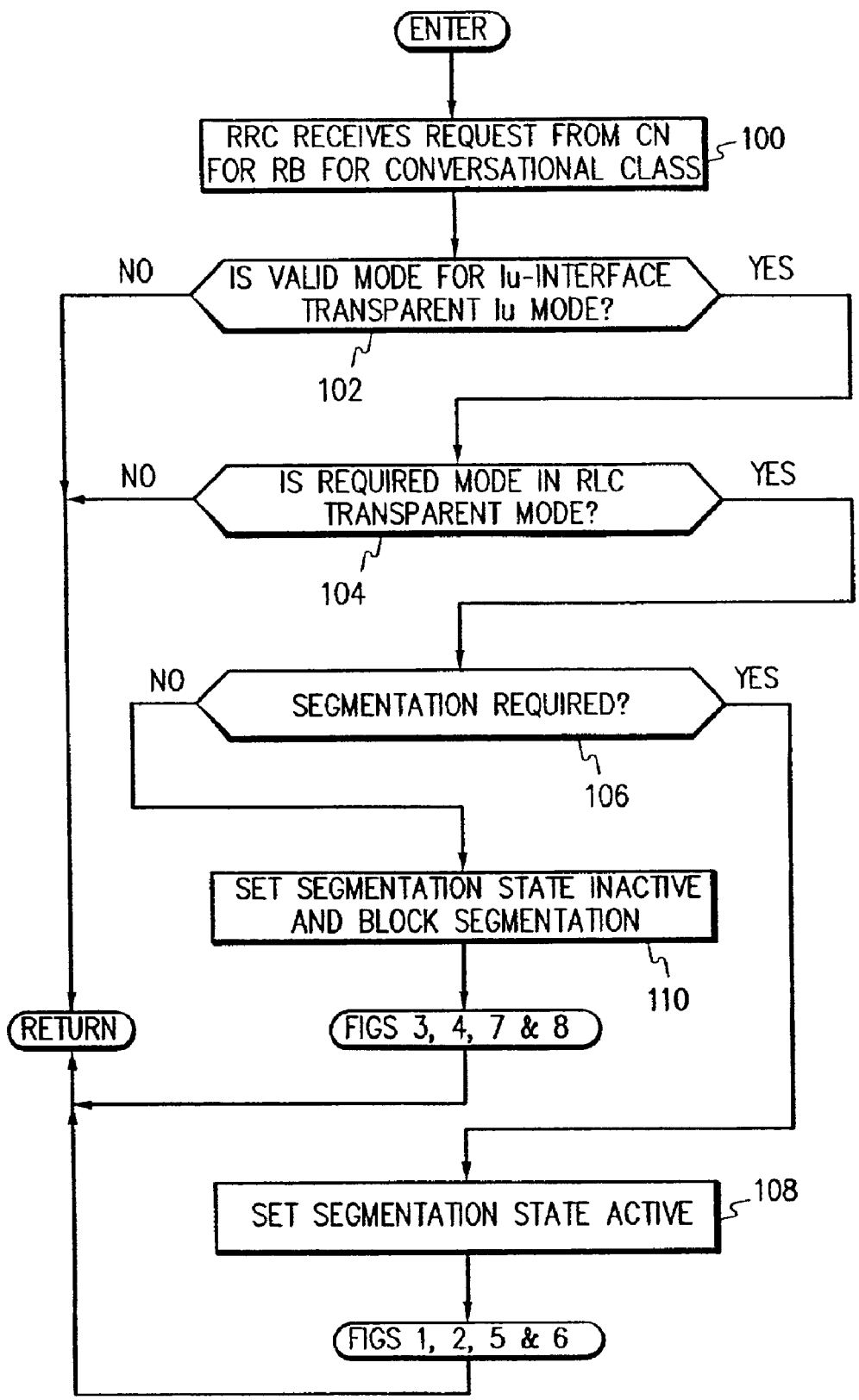
FIG. 14 shows a procedure, according to the present invention, for utilizing transparent mode (TrM) in operation of the UP protocol, according to the present invention, using one of two segmentation states.
Figure 15:
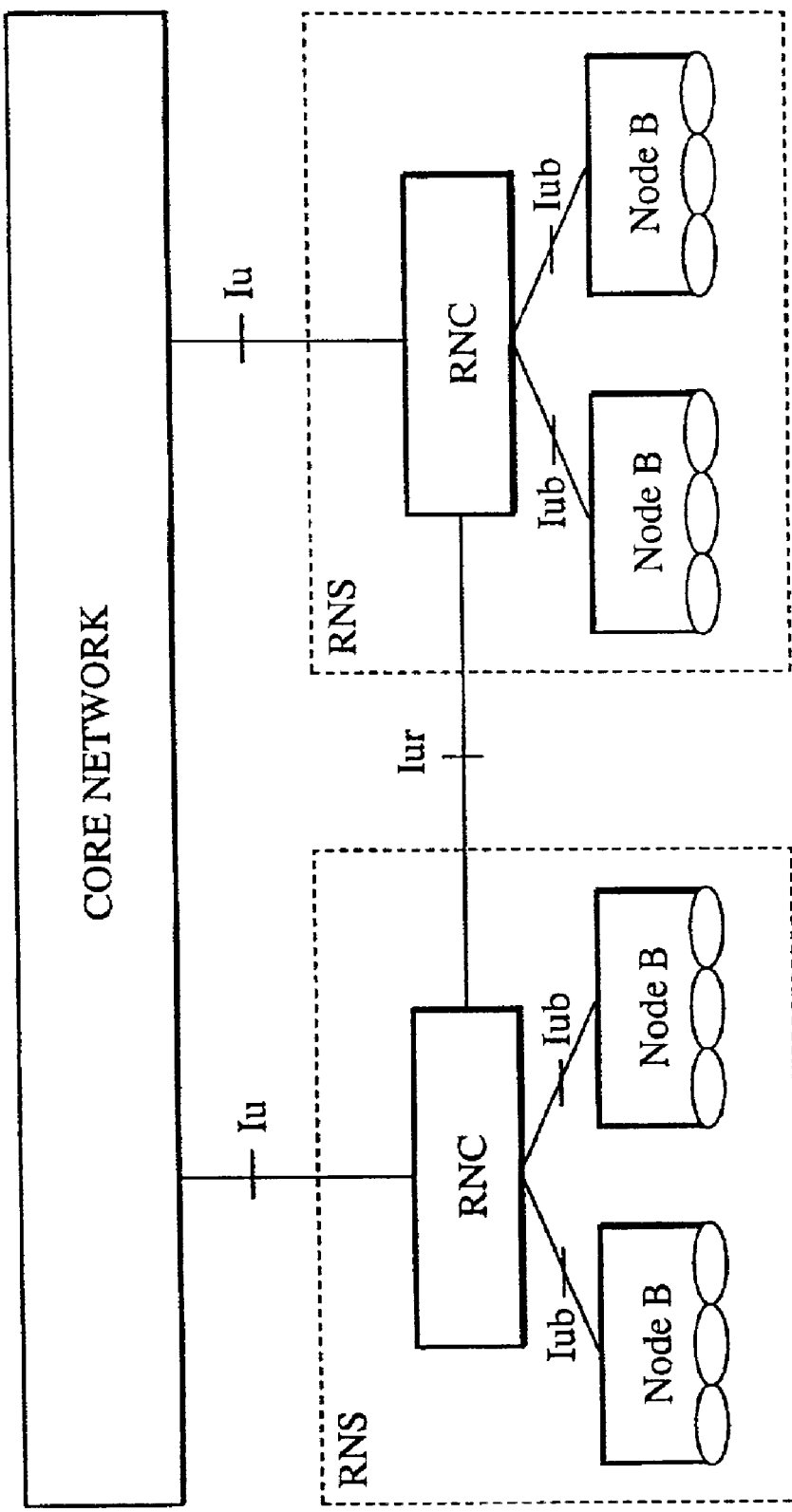
FIG. 15 shows details of two radio network servers connected to the same core network and interconnected to each other according to the proposed UMTS architecture, as also shown in FIG. 10.

As shown for example beginning in a step 100 in FIG. 14, after the UE has requested of the CN (3G-SGSN) that a PDP context be activated, and upon reception of an RAB assignment request from the CN (3G-SGSN), the RRC in the RNC can define the requested RAB and RB for the connection based on factors such as QoS parameters defined by the CN in the RAB assignment request. For instance, if an RB for conversational class is required, a step 102 determines if the valid mode for the Iu-interface is a Transparent Iu mode. If so, a step 104 determines if the required mode in RLC is transparent mode. If so, then according to the invention the RRC should define whether segmentation is required or not, as indicated in a step 106. This can be done with the above-mentioned "Segmentation State Indication" bit which indicates with a "1" that segmentation is performed (active state) and with a "zero" that segmentation is to be blocked (inactive state). This decision will also be based on information which is used to define the valid TTI for the Iub interface (between the RNC and the Node-B (See FIG. 15, where "Node B" corresponds to the base-transceiver station of GSM/GPRS)). It should be realized that the invention is not restricted to the precise protocol stacks and layers described herein for a best mode embodiment. For instance, the invention is generally applicable to segmentation/reassembly at whatever layer it is carried out, not just at the RLC layer as disclosed herein or even with segmentation and reassembly occurring at different layers and the meaning of segmentation/reassembly layer as used herein shall be understood to embrace that meaning as well.

With that in mind and referring again to FIG. 14, if segmentation is required then the TTI used in UTRAN and the transmission interval on the Iu-interface (ITI) are equal and the valid state for the segmentation on the transparent RLC is an active state, as set in a step 108. However if the valid TTI for UTRAN is other than 10 ms (e.g., 20, 40 or 80 ms) then the segmentation in transparent RLC should be set to the Inactive state, as indicated in a step 110.

Figure 12:
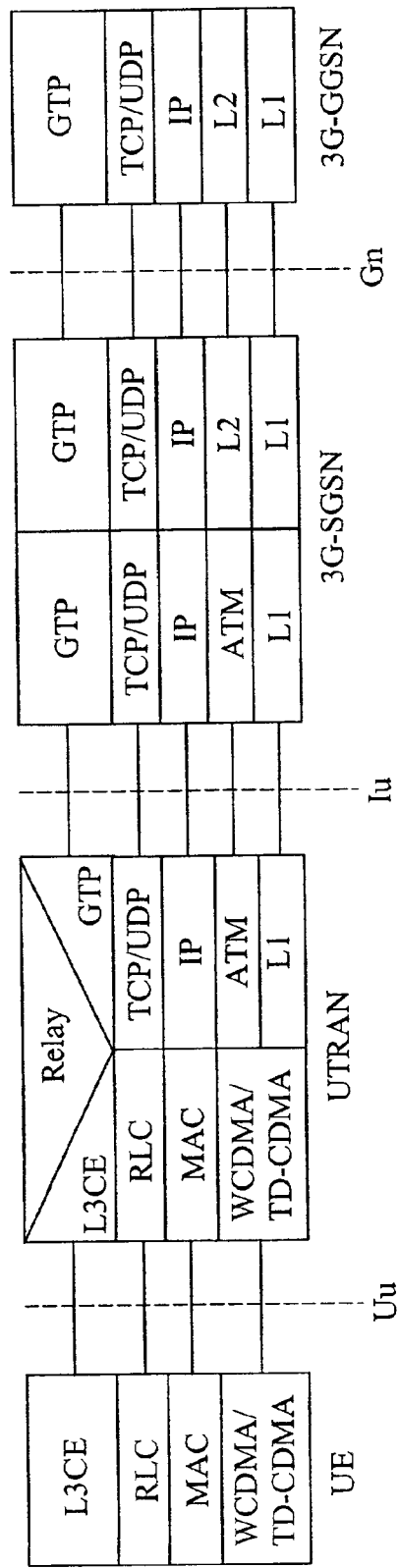
FIG. 12 shows one proposal for the user plane protocol stack for UMTS.

Because the valid Segmentation State needs to be the same for both RLC entities on both sides of the Uu interface of FIG. 12, the indication about the valid segmentation state is given to the peer RLC entity, e.g., in the UE inside the RLC info, which could contain such a parameter as the above-disclosed Segmentation State Indication (Boolean). Again, if the value of the parameter is TRUE then the state of segmentation is the active state and this function is required to be supported, otherwise the state of the segmentation is inactive and no segmentation is allowed to be performed on the transparent RLC.

Downlink/Uplink Data Transmission in Transparent Mode (TrM) with Active Segmentation State (FIGS. 1, 2, 5 and 6)

In such cases the RRC indicates to the RLC that the segmentation state is active by means of the above-mentioned segmentation state indication bit included with the RLC info. Upon either uplink or downlink data transmission when the valid segmentation state is in the active state the transparent RLC performs the segmentation (if it is needed, e.g., received SDU is too big to fit into the valid RLC PDU defined by the TF) according to a predefined pattern. This pattern defines that all RLC PDUs carrying one RLC SDU shall be sent in one transmission time interval and only one RLC SDU can be segmented in one transmission time interval. On the other hand, it should be realized that the active segmentation state could also be elaborated further by explicitly defining a predefined pattern as to how the segmentation is to be performed. An example pattern which is different from that contemplated by standard setting bodies today would be that in a TBS (transport block set; see §7.12 of 3G TF 25.302) of 4 blocks, the first block would always form the first SDU and the three following blocks would always form the second SDU.

If no segmentation is required (i.e., the received SDU fit exactly into the valid RLC PDU) the RLC PDU containing only one SDU is transmitted to the peer RLC by using the procedures already defined in the 3GPP TSG RAN specifications. If segmentation is required the number of RLC PDUs is defined by the Transport Block Set (TBS) size (the number of bits in a TBS). Again, these Transport Blocks are transmitted by using the procedures which have been or will be defined in the 3GPP TSG RAN specifications.

Figure 1:
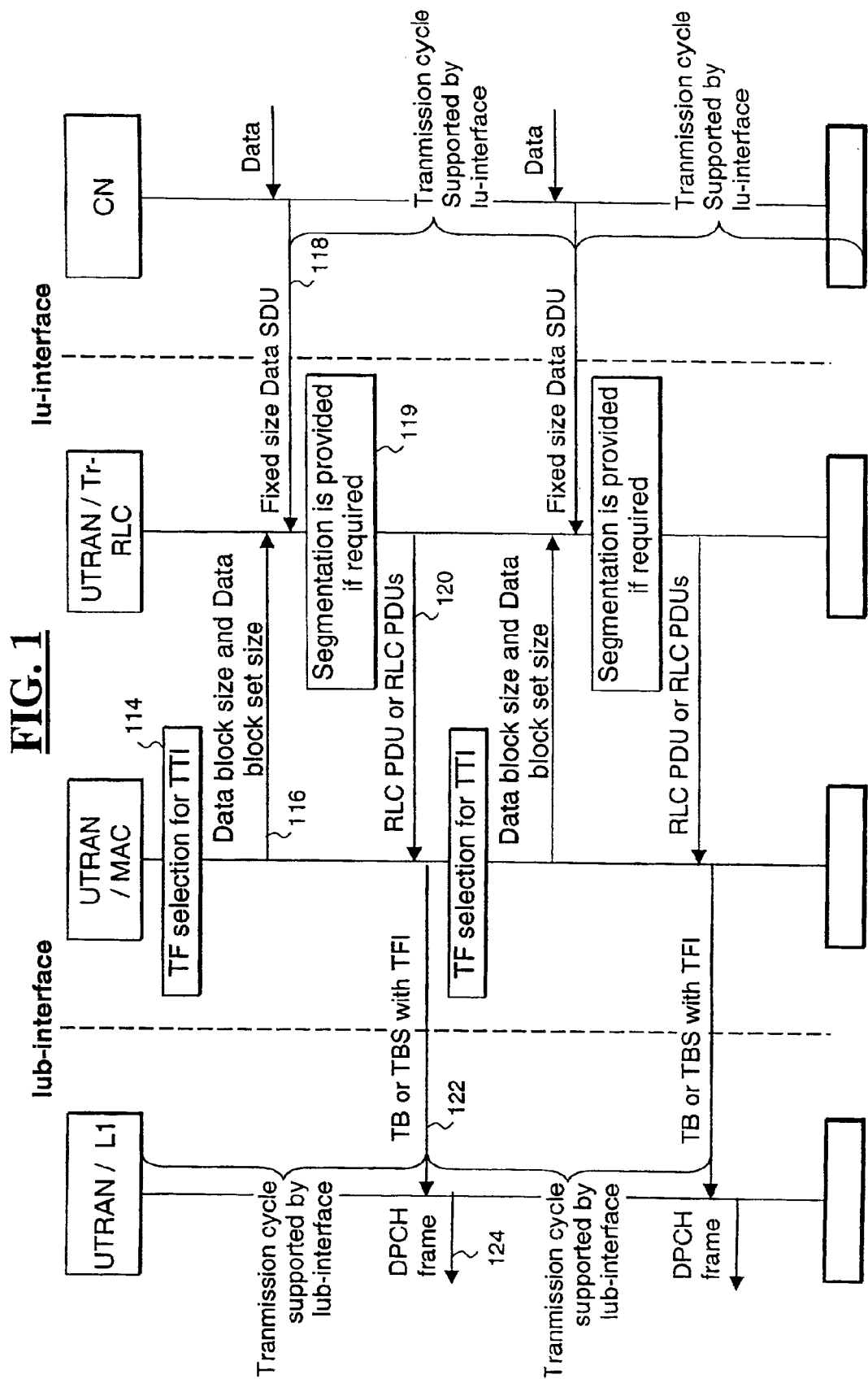
FIG. 1 shows a flowchart for downlink data transmission in an active segmentation state in the UTRAN.
Figure 10:
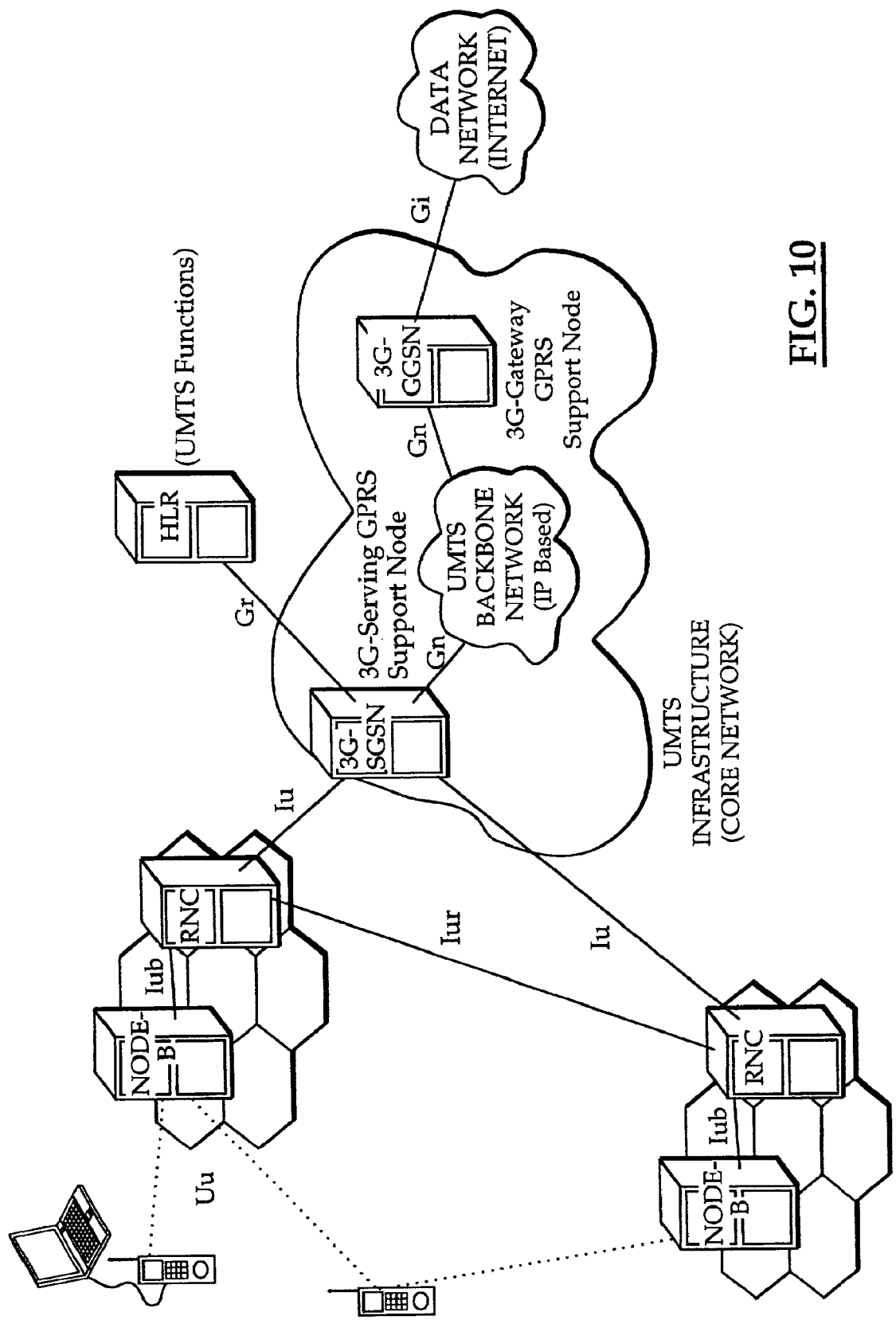
FIG. 10 shows some further details of the overall architecture of the UMTS.

For instance, as shown for the downlink data transmission with an "active segmentation" state in FIG. 1, the UTRAN/MAC will obtain a TFC from RRC and will make a TF selection for an upcoming TTI, as shown in a step 114. It will inform the UTRAN/Tr-RLC of the appropriate data block size and data block set size in a step 116. At the same time, the CN will have informed the RLC of the segmentation state and will also have sent data across the Iu-interface in the form of a fixed-size data SDU to the UTRAN/Tr-RLC, as indicated in a step 118. Segmentation is then provided by the RLC if required in a step 119. The RLC then inserts the correct segmentation state indication bit for transmission to the RLC peer at the UE and sends an RLC PDU or RLC PDUs to the MAC, as indicated in a step 120. The MAC then sends the RLC PDU or PDUs to the physical layer in a transport block or a transport block set, as indicated in a step 122 over the Iub-interface (see FIGS. 10 and 15). The physical layer sends the transport block or transport block set in a dedicated physical channel (DPCH) frame to the UE, as indicated in a step 124. If there is more incoming data, such as indicated in FIG. 1, then a decision is made to repeat the steps 118, 119, 120, 122, 124, as before, until there is no more data, as suggested in FIG. 1.

After transport on the radio link from the UTRAN to the UE over the Uu interface, the UE receives the DPCH frames transmitted from the UTRAN, as shown in FIG. 2. Upon reception of each frame 128, the transport block or transport block sets will be reassembled based on the transport format indicator (TFI), as shown in a step 130. The reassembled TB or TBSs are then provided to the MAC layer, as indicated in a step 131, where an RLC PDU or RLC PDUs are extracted and provided to the UE/Tr-RLC, as indicated in a step 132, where reassembly of fixed-size data SDUs is provided, if required by the Segmentation State Indicator, in a step 134. The fixed-size data SDU is provided to the application layer in a step 136. If more incoming frames are available, as suggested in FIG. 2, then the steps 128, 130, 131, 132, 134 and 136 are repeated until there are no more DPCH frames.

Figure 6:
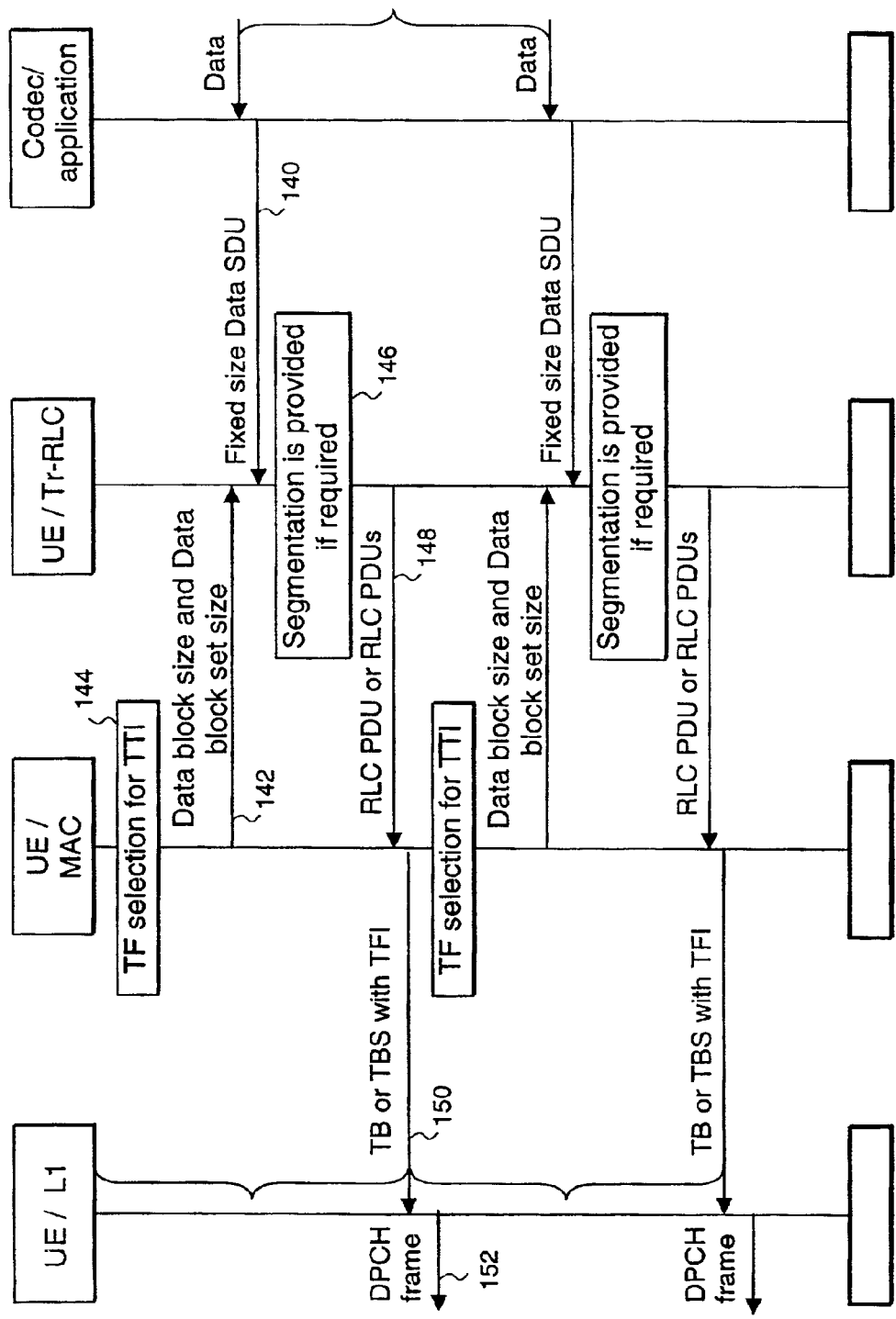
FIG. 6 shows a flowchart for uplink data transmission in the active segmentation state at the UE.

Referring now to FIGS. 5 and 6 for uplink data transmission with an "active" segmentation state, reference is first made to FIG. 6, which shows a codec 138 or other application at the application layer providing, as shown in a step 140, data in the form of a fixed-size data SDU to the UE/Tr-RLC where the UE/MAC layer has already indicated in a step 142 a data block size and block set size, according to the transport format selected for the next TTI in a step 144. If segmentation has been required at the RLC layer, it is provided in a step 146, and an RLC PDU or PDUs are provided to the MAC layer in a step 148, as indicated, with the segmentation state indicator set for "1" or otherwise indicating the active state to the peer RLC layer in the UTRAN. The UE/MAC layer then provides a transfer block or transfer block set with a transport format indicator to the UE physical layer, as shown by a step 150, which provides the TB or TBS in a DPCH frame over the radio interface to the UTRAN, as indicated in a step 152. If more data is available, the previous steps are repeated until there is no more data, as suggested by FIG. 6.

At the other end of the uplink is the UTRAN, and it receives the DPCH frames provided to it over the radio link from the UE and handles them as shown in FIG. 5. Upon reception of a DPCH frame, as indicated in a step 156, the physical layer reassembles the transfer block or transfer block set based on the indicated transfer format, as carried out by the indicated step 158. The reassembled TB or TBSs are provided to the UTRAN/MAC layer, as indicated in a step 160, where an RLC PDU or RLC PDUs are extracted and are provided to the UTRAN/Tr-RLC with the segmentation state being indicted as active, where they are reassembled to a fixed-size SDU, as indicated in a step 164. The fixed-size SDU is provided to the CN, as indicated in a step 166. If more DPCH frames are incoming over the uplink, the previous steps 156, 158, 160, 162, 164, 166 are repeated until there is no more incoming data as suggested by the figure.

Downlink Data Transmission in Transparent Mode (TrM) with Inactive Segmentation State (FIGS. 3, 3A, 3B & 4)

Figure 3A:
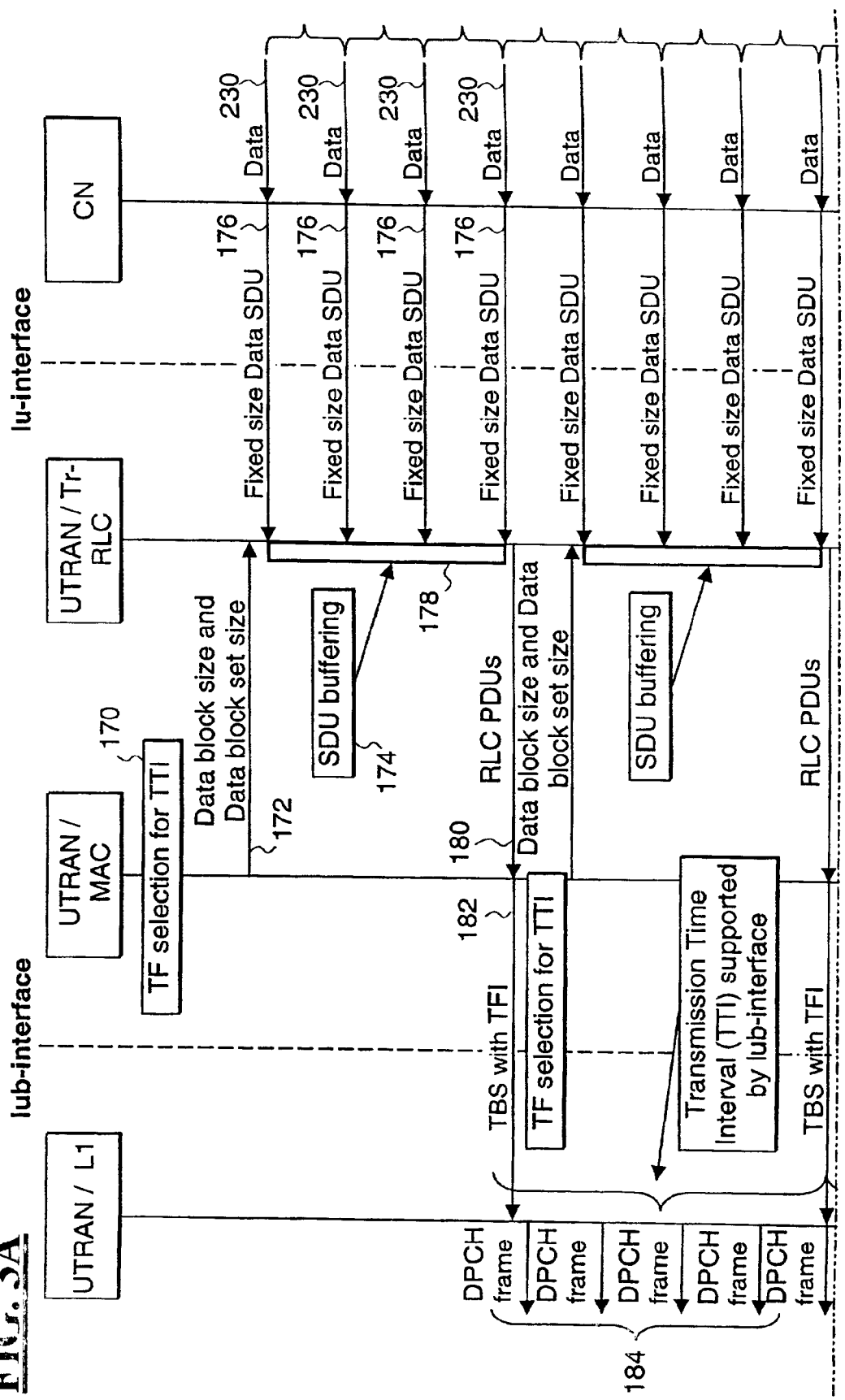

For downlink data transmission, if the supported transmission interval on the Iu-interface and the TTI in UTRAN differ, e.g., as determined in the step 106 of FIG. 14, the segmentation shall be set to the inactive state and the RLC informed by means of the segmentation state indicator bit, as indicated in the step 110. Referring to FIGS. 3, 3A, 3B, after the segmentation state has been set to the inactive state in the step 110 of FIG. 14, or similar, the MAC obtains the transport format combination set (TFCS) from the RRC, as indicated in a step 170. The MAC then informs the RLC of the data block size and data block set size to be used in the TTI in a step 172. In a step 174, the RLC then stores a sequence of fixed-size SDUs 176 that it has obtained from the CN in RLC buffers 178 until there is enough data to fill up the transport block or the transport block set indicated by the MAC. In this "inactive" segmentation state fixed-size data packets (SDUs), which are received from the CN via the Iu-interface are buffered on the transparent RLC (UTRAN/Tr-RLC SDU buffering) in the order in which they arrived to the RLC buffer until it is time, based on the TTI value and the Transport Block set size, to forward the buffered RLC PDUs to the MAC layer. When the RLC PDUs are sent to the MAC layer as indicated in a step 180, the order of the RLC PDUs must be maintained, in order for the peer entity to be able to define the correct order of the RLC PDUs (i.e., the same order must be maintained along the whole path from the RLC entity in UTRAN to the RLC entity in UE).

The TTI in FDD mode is a parameter of the semi-static part of the TF (see §7.1.6 of 3G TS 25.302), whereas in TDD mode the TTI is a parameter of dynamic part of the TF. The Transport Block size (§7.1.3) and Transport Block set size (§7.1.4) are both parameters of the dynamic part of the TF (for both FDD and TDD modes). The Transport Block size (the number of bits in a Transport Block) corresponds to the size of the RLC PDU, whereas the Transport block set size defines the number of RLC PDUs transmitted within one TTI (this is illustrated in 3GPP TSG RAN TS 25.302 at FIG. 6 thereof).

From the MAC layer further on to the UE the RLC PDUs are sent by using the procedures which have been described in 3GPP TSG RAN specifications. In particular, the MAC selects the transport format from the transport format set, as indicated in a step 182 in FIG. 3A, and transfers RLC PDUs to the physical layer with a Transport Format Indicator (TFI) and the segmentation state indicator. The physical layer then sends the RLC PDUs in DPCH frames over the radio interface, as indicated in a step 184. As suggested by FIGS. 3, 3A and 3B, if there is more data from the CN, the previous steps are repeated until there is no more data coming from the CN.

Figure 9:
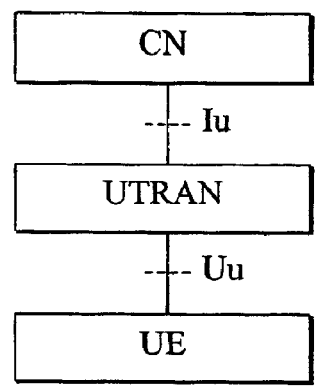
FIG. 9 shows the proposed packet network architecture for the Universal Mobile Telecommunications System (UMTS).
Figure 11:
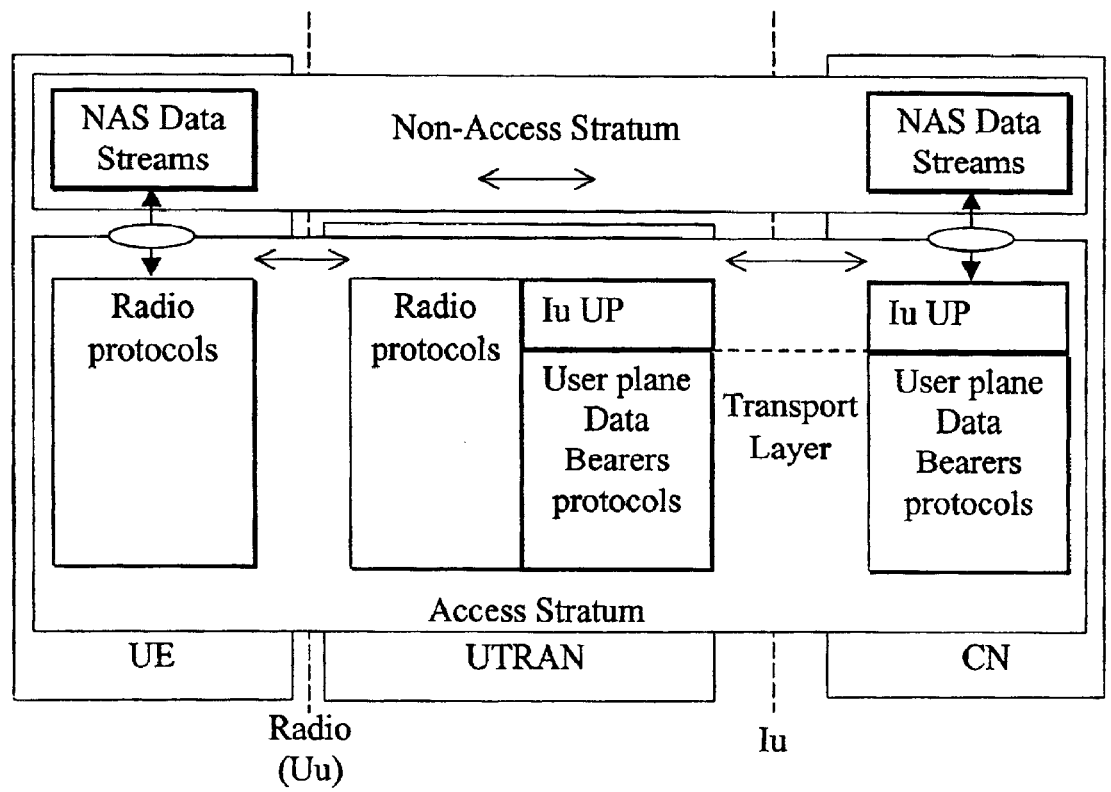
FIG. 11 shows the Iu protocol with a user plane protocol for implementing a radio access bearer service.
Figure 16:
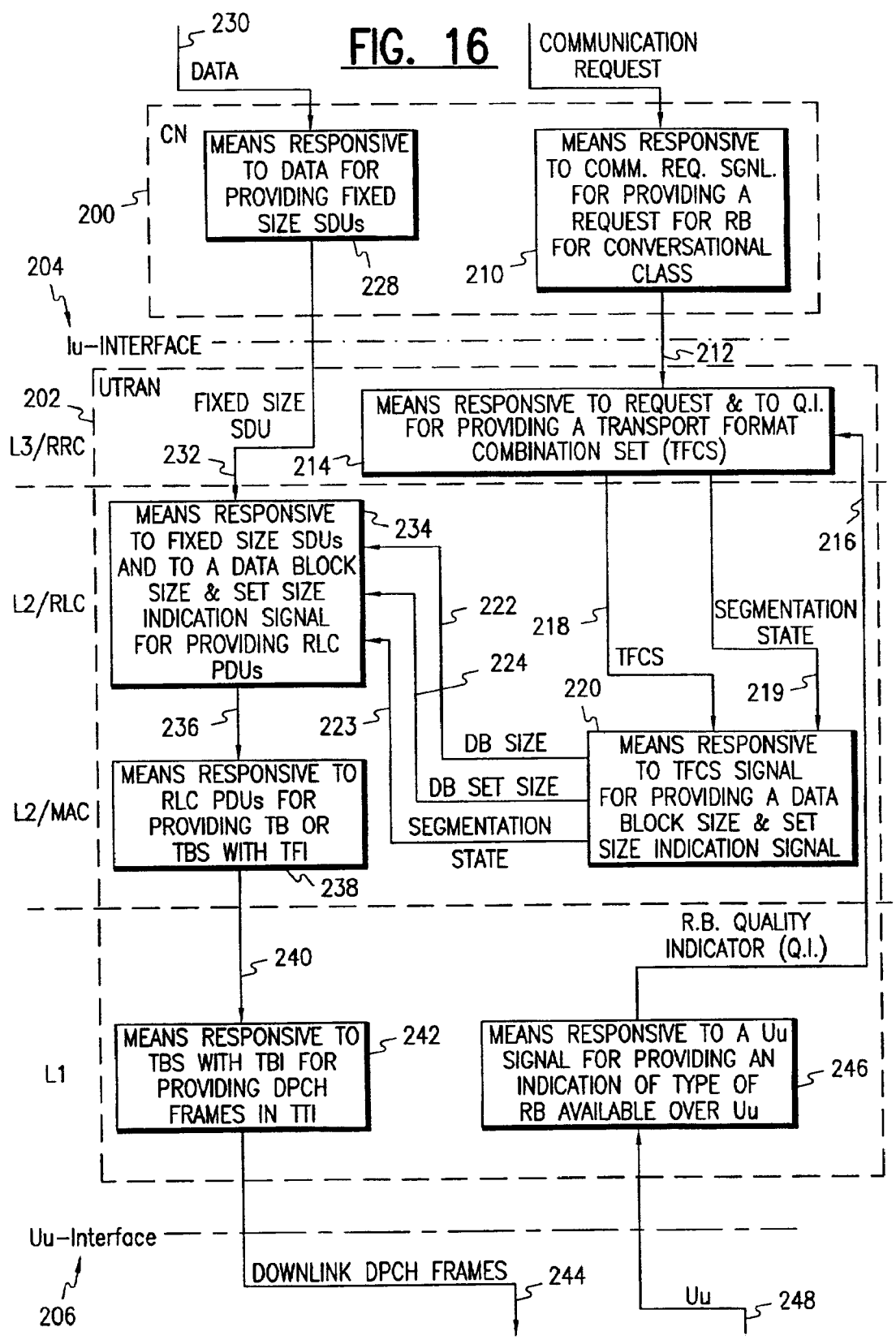
FIG. 16 shows apparatus for carrying out the steps shown in FIG. 1 for the active state or FIG. 3 for the inactive state on the downlink.

Apparatus for carrying out the above steps for downlink data transmission with an inactive segmentation state is shown in FIG. 16. A core network (CN) 200 is shown connected to a UMTS Terrestrial Radio Access Network (UTRAN) 202 over a Iu-interface 204. The UTRAN 202 communicates with a UE (FIG. 17) over a Uu-interface 206. It will therefore be understood that FIG. 16 shows details of the CN and UTRAN of FIG. 9 with respect to downlink data transmission with an inactive segmentation state, according to the present invention. Within the CN 200 of FIG. 16, a means 210 is shown that is responsive to a communication request signal such as a UE initiated request (such as ACTIVATE_PDP_CONTEXT REQUEST), for providing a bearer request signal on a line 212 for a radio bearer (RB) (e.g., RAB_ASSIGNMENT_REQUEST) for conversational class, and as shown by the step 100 of FIG. 14. This may include an indication of the segmentation state to be used for transparent mode. An RRC layer means 214 within the UTRAN 202 is responsive to the RB request signal on the line 212 and to a RB quality indicator signal on a line 216 for providing a Transport Format Combination Set (TFCS) signal on a line 218 as well as a Segmentation state indication Signal on a line 219. The means 214 may also be used to carry out the steps 102, 104, 106, 110 of FIG. 14. A means 220 is responsive to the TFCS signal on the line 218 and the segmentation state signal on the line 219 for providing a data block size signal on a line 222, a segmentation state indication signal on a line 223, and a data block set size signal on a line 224, as shown by the step 172 of FIG. 3A.

In addition to the CN 200 sending an RB request signal to the UTRAN 202, it may also include means 228 responsive to data on a line 230 (e.g. from outside the UMTS) for providing fixed-size SDUs on a line 232 to the UTRAN 202. This is shown as the step 176 in FIG. 3A. A buffer means 234 is responsive to the fixed size SDUs on the line 232, to the data block size signal on the line 222 as well as the data block set size signal on the line 224 and the segmentation state indicator signal on the line 223 for storing RLC PDUs and for providing same on a line 236 at the appropriate time with the segmentation state indicator signal bit for transfer to the peer RLC layer at the UE. This is the same a shown by the buffer 178 of FIG. 3A with the SDU buffering 174.

A means 238 is responsive to the RLC PDUs provided on the line 236 for providing a transport block or a transport block set containing said RLC PDUs along with a transport format indicator (TFI) on a line 240. This is the same as shown by the step 180 of FIG. 3A. A means 242 is responsive to the TB or TBS with TFI signal on the line 240 for providing same in DPCH frames in the TTI for transfer on a line 244 over the Uu-interface 206. See steps 182, 184 of FIG. 3A.

Referring back to the signal on the line 216, it has a magnitude indicative of the available quality of a radio bearer, which might be set up according to the request of the CN 200. This is determined by a means 246 responsive to a Uu signal on a line 248.

It should be realized that the functional blocks shown in FIG. 16 as well as similar figures described below can be carried out in various combinations of hardware and software and that moreover the functions shown in distinct blocks at distinct levels are not necessarily fixedly associated to those blocks or levels but can be carried out in different blocks and at different levels by transferring functions to other blocks or levels. Indeed the signals shown for indicating cooperation between the various blocks are similarly flexible in their location and role in connecting similar blocks that may be reconstituted to carry out the same or similar functions.

Figure 17:
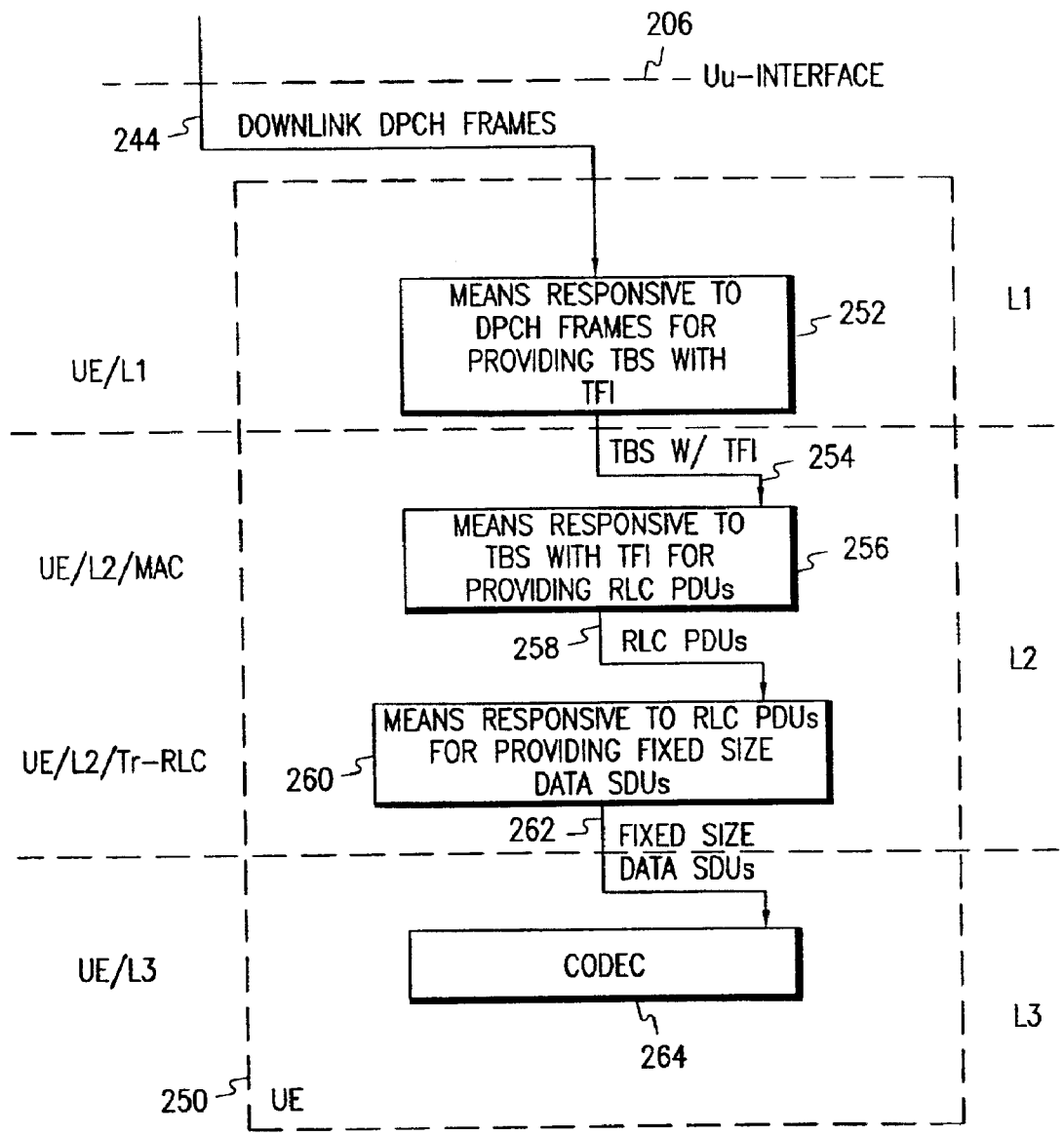
FIG. 17 shows apparatus for carrying out the steps shown in FIG. 2 on the downlink for the active segmentation state, or FIG. 4 on the downlink for the inactive segmentation state at the UE.

FIG. 17 shows a continuation of the downlink of FIG. 16 at the UE end. A UE 250 is shown, including a means 252 responsive to the downlink DPCH frames on the line 244 received over the Uu-interface 206. See also FIG. 4. In response to the DPCH frames received in a TTI, the means 252 provides the TBS with TFI on a line 254 to a means 256 at the MAC level of the UE. This is shown by a step 257 in FIG. 4. The means 256 is responsive to the TBS with TFI and inactive segmentation indicator for providing RLC PDUs on a line 258 to a means 260 responsive thereto for providing fixed-size data SDUs on a line 262 to a codec 264 or other application at the UE/L3 layer or higher. This is shown in FIG. 4 by a step 265.

It should be mentioned that at the UE side (FIGS. 4 and 17) the received RLC PDUs can be sent to the codec or application either all at the same time or sequentially. Which method shall be used is an implementation issue.

In this inactive segmentation state one RLC PDU contains exactly one SDU (i.e., the number of RLC PDUs also defines the number of SDUs).

Uplink Data Transmission in Transparent Mode with Inactive Segmentation State

For uplink data transmission in the inactive segmentation state the procedure supported by the UE is similar to the above-described procedure for downlink data transmission with inactive segmentation in UTRAN. This inactive segmentation state procedure (see FIGS. 8, 8A and 8B) is dictated by the RRC of the UE and defines that the UE shall not perform segmentation on the RLC layer in any phase. The number of RLC PDUs and the valid TTI for the Iub-interface is defined by the TF, which is given to the UE upon setting up the corresponding RB. This RB setup procedure and selection of the TF has been described in 3GPP TSG RAN specifications and will be described in more detail below in conjunction with FIG. 18.

Figure 18:
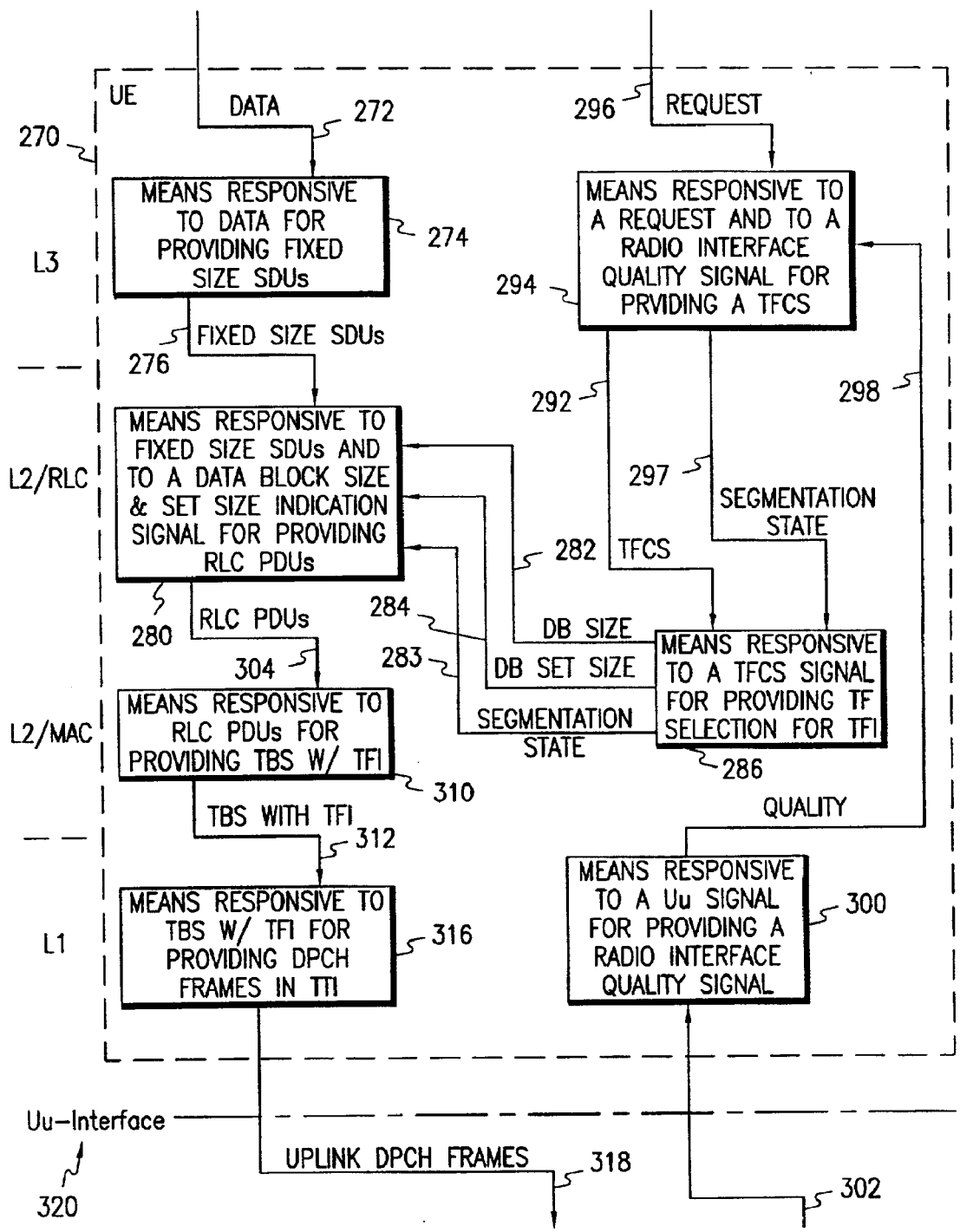
FIG. 18 shows apparatus for carrying out the steps shown in FIG. 6 for uplink data transmission in the active segmentation state at the UE, or for inactive segmentation as shown in FIG. 8.

Referring now to FIG. 18, a UE 270 is shown having means for carrying out uplink transparent mode data transmission with inactive segmentation state indicated. In response to incoming data on a line 272, means 274 responsive thereto provides fixed-size SDUs on a line 276 and as indicated by a step 278 in FIG. 8A. A means 280 is responsive to the fixed-size SDUs for buffering same. The means 280 is also responsive to a data block size signal on a line 282, a segmentation state indicator signal on a line 283, and a data block set size signal on a line 284 from a means 286 at the MAC level of the UE. The provision of the signals on the lines 282–298 corresponds to a step 288 shown in FIG. 8A that is executed once a TF selection for the next TTI has been made, as indicated by a step 290. The TF selection is made at the MAC level, but the selection is made from a TFCS, as indicated on a line 292 from the RRC layer, e.g., by a means 294 responsive to a request signal on a line 296 and to a radio interface quality signal on a line 298 for providing the TFCS signal on the line 292 and a Segmentation state indicator signal on a line 297 to the means 286. A means 300 at the physical layer is responsive to a signal on a line 302 indicative of the quality of the radio interface and its ability to support varying degrees of bandwidth that may be requested on the line 296.

Figure 8A:
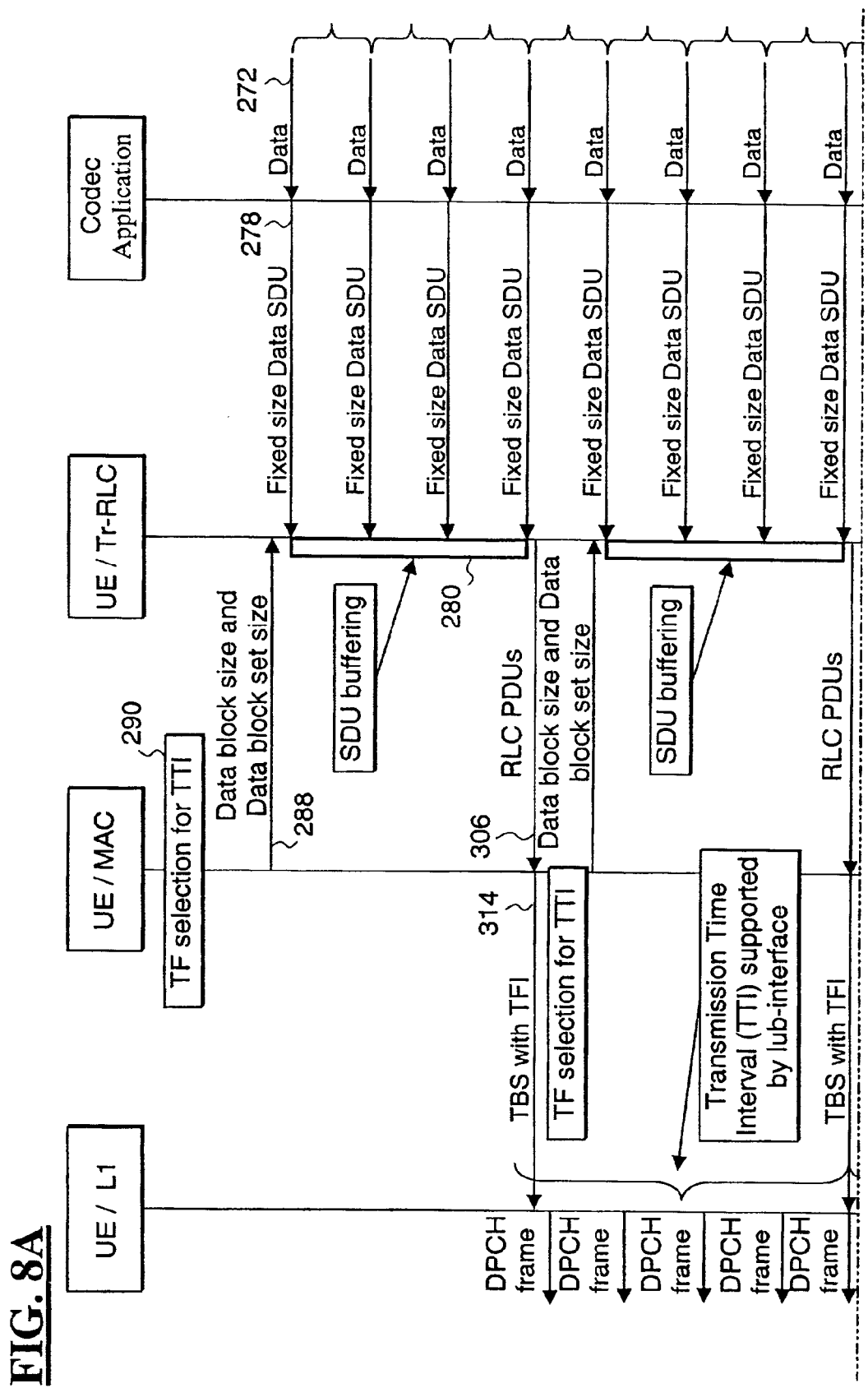

The means 280 provides RLC PDUs along with the inactive segmentation state indicator (for the UTRAN RLC layer) on a line 304, as indicated by a step 306 to the UE/MAC layer, as shown in FIG. 8A. Means 310 at the MAC layer pictured in FIG. 18 is responsive to the RLC PDUs on the line 304 for providing a transport block set with a transport format indicator signal on a line 312, as indicated by a step 314 in FIG. 8A. Means 316 at the physical layer of FIG. 18 is responsive to the TBS with TFI signal on the line 312 for providing uplink DPCH frames on a line 318, as indicated also in FIGS. 8A & 8B over a Uu-interface 320. It will be noted from FIGS. 8A & 8B that the size of the TTI at the Uu interface is advantageously much larger than the frame size of the fixed-size data SDUs at the codec/application layer according to the inactive segmentation procedure of the present invention. This will be shown to be true throughout the UTRAN (all the way to the Iu-interface) as well, as discussed below.

Figure 7:
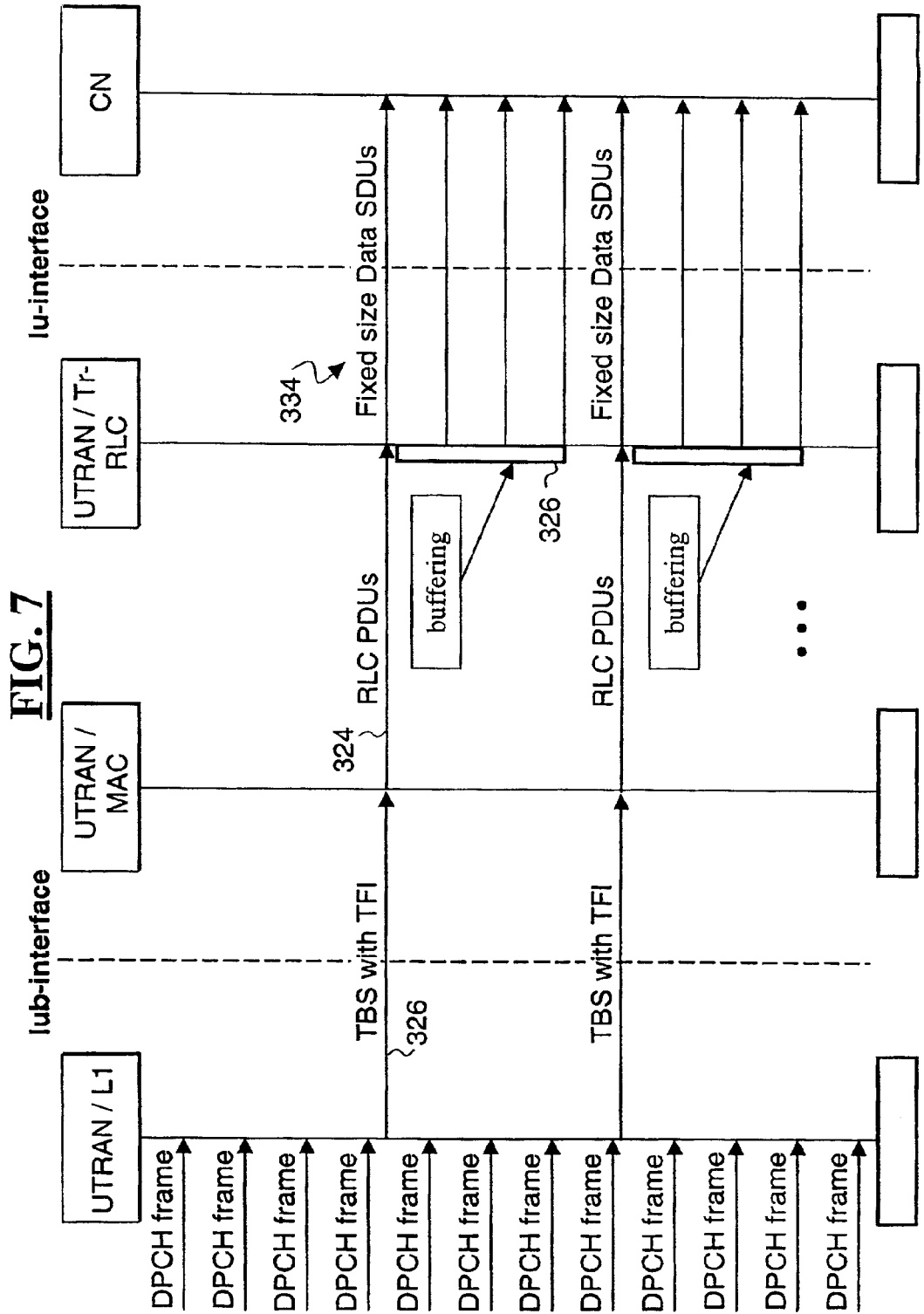
FIG. 7 shows a flowchart for uplink data transmission in the inactive segmentation state at the UTRAN.
Figure 19:
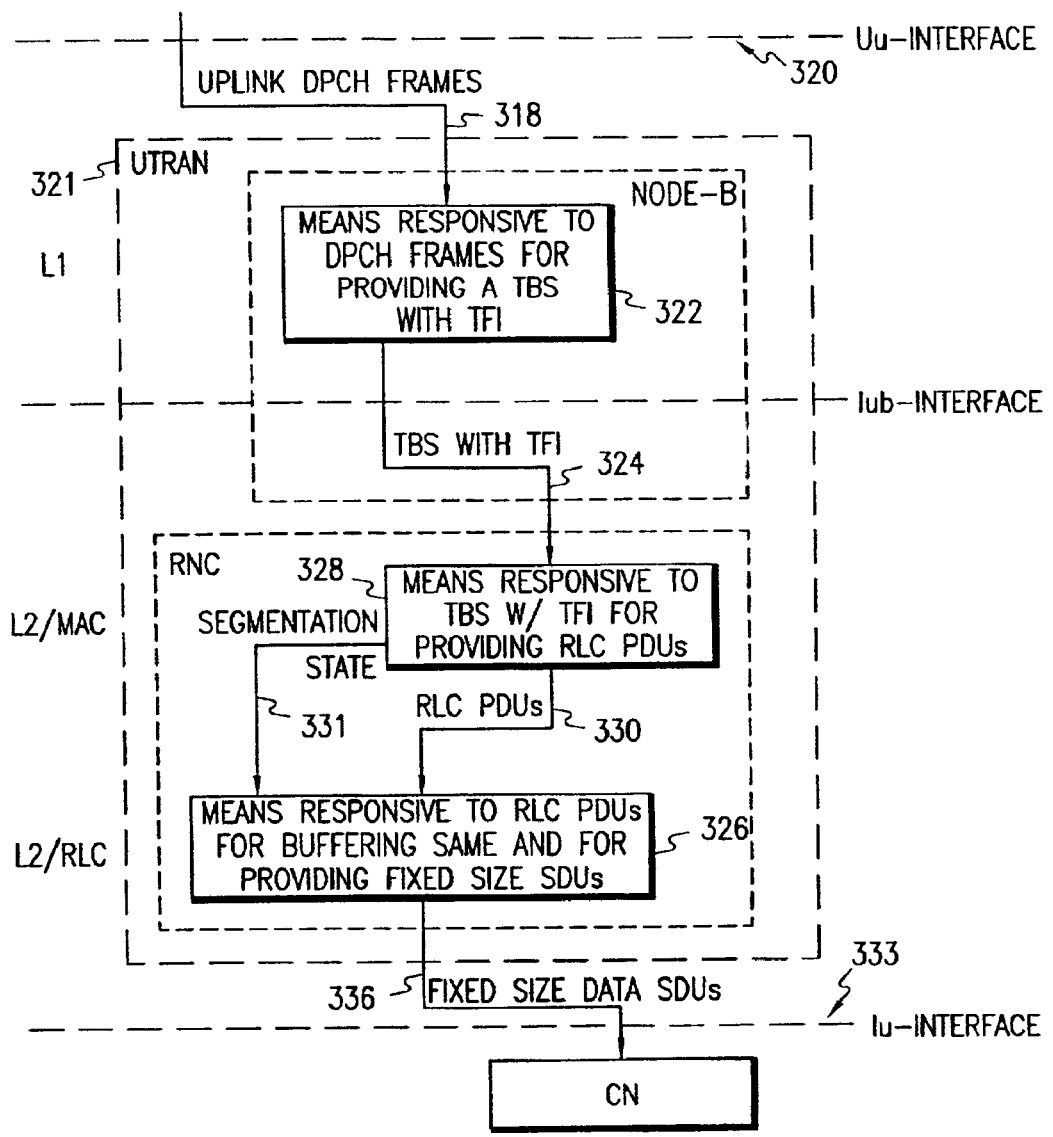
FIG. 19 shows uplink data transmission for the active segmentation state at the UTRAN, as shown in FIG. 5, or for inactive segmentation as shown in FIG. 7.

At the UTRAN side (see FIGS. 7 and 19), the DPCH frames on the uplink from the UE are provided on the line 318 over the Uu-interface 320 to the UTRAN 321, where they are received by a means 322 responsive thereto, for providing a TBS with TFI on a line 324, as shown in FIG. 19, as well as by a step 326 in FIG. 7. At the RNC MAC layer, a means 328 is responsive to the TBS with TFI for providing RLC PDUs on a line 330 as well as the inactive segmentation state indicator on a line 331, as also indicated by the step 324 of FIG. 7. The transparent RLC entity 322 of FIG. 7 receives all RLC PDUs at the same time from the MAC layer, as indicated by the step 324 and stores them in a buffer 326. The RLC entity saves the order in which RLC PDUs were forwarded from the MAC layer to the RLC layer. The RLC layer buffers RLC PDUs until it is required to transmit the received SDUs in RLC PDUs one at a time to an Iu interface 333 via Iu UP protocol layer, as indicated by a step 334 and as also shown by a signal line 336 in FIG. 19. The transmission interval for the Iu interface will be defined upon the RAB assignment and the RB setup procedure (currently TR 23.910 defines that the only applicable transmission interval for the Iu-interface is 10 ms) and it will be given to the RLC layer for buffering and SDU transmission purposes by the RRC.

The State of the Segmentation Upon SRNS Relocation and RESET Procedure

The segmentation mode defined upon RB setup procedure cannot be changed upon SRNS relocation procedure or when RLC RESET procedure has been performed.

Implementation by Blocking Segmentation

It should therefore be understood that this invention can, for instance, be implemented by blocking the segmentation function on the RLC layer each time when it is required by the RRC. The blocking can be done by sending a blocking primitive to the corresponding RLC entity or by defining a parameter into the RLC configuration primitive. This primitive can be generated by the RRC based on information which it has either received from the CN or which it has derived from the RAB parameters sent by the CN in a RANAP:RAB Assignment request message, i.e., from the 3G-SGSN RANAP to the UTRAN RRC.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for use in establishing a radio bearer (RB) relating to a request from a core network (CN) to a radio access network (RAN) in a mobile telecommunications system (UMTS), comprising the steps of:

determining (102) that a requested mode for an interface between said CN and said RAN is a transparent mode and signaling a segmentation state indicator to a segmentation/reassembly layer of said RAN; and in response to said segmentation state indicator, blocking (110) segmentation in said segmentation/reassembly layer of said RAN for said RB in case said indicator indicates an inactive segmentation state and permitting (108) segmentation in said segmentation/reassembly layer of said RAN in case said indicator indicates an active segmentation state.

2. The method of claim 1, in case said segmentation is blocked in said RAN for an RB downlink, further comprising the steps of:

storing (174) plural service data units (SDUs) under the control of the segmentation/reassembly layer in said RAN, each SDU provided from the CN in a minimum interleaving period in said transparent mode;

retrieving said stored plural SDUs and providing (180) said retrieved plural SDUs in one or more protocol data units (PDUs) in one or more data transport blocks; and providing (182) said one or more data transport blocks with a transport format indicator (TFI) for transmission over a radio interface from said RAN to a user equipment (UE) in a transmission time interval (TTI) having a duration greater than said minimum interleaving period.

3. The method of claim 2, further comprising the steps of:

receiving (265) said PDUs from said transport blocks at a segmentation/reassembly layer of said UE; and providing said fixed-size data SDUs to a layer of said UE above said segmentation/reassembly layer.

4. The method of claim 1, in case said segmentation is blocked in said RAN for an RB uplink, further comprising the steps of:

storing plural service data units (SDUs) at a segmentation/reassembly layer in said UE, each SDU provided (278) in a minimum interleaving period in said transparent mode;

retrieving said stored plural SDUs and providing (306) said retrieved plural SDUs in one or more protocol data units (PDUs) in one or more transport blocks; and providing (314) said one or more transport blocks with a transport format indicator (TFI) for transmission over a radio interface from said UE to said RAN in a transmission time interval (TTI) having a duration greater than said minimum interleaving period.

5. The method of claim 4, further comprising the steps of:

receiving said one or more transport blocks with TFI at a medium access control (MAC) layer of said RAN;

extracting said PDUs from said transport blocks at said MAC layer of said RAN;

providing (324) said PDUs from said MAC layer of said RAN to a segmentation/reassembly layer of said RAN;

storing said PDUs at said segmentation/reassembly layer of said RAN;

extracting said fixed-size SDUs from said stored PDUs; and providing (334) said fixed-size SDUs from said RAN to said CN over said interface.

6. Method for handling fixed-size service data units (SDUs) in a downlink from a core network of a mobile telecommunications system by a radio access network (RAN) of said system, comprising the steps of:

storing plural SDUs at a radio link control segmentation/reassembly layer in said RAN, each SDU provided in a minimum interleaving period in a transparent mode;

retrieving said stored plural SDUs and providing said retrieved plural SDUs in one or more protocol data units (PDUs) in one or more data transport blocks; and providing said one or more data transport blocks with a transport format indicator (TFI) for transmission over a radio interface from said RAN to a user equipment (UE) in a transmission time interval (TTI) having a duration greater than said minimum interleaving period.

7. The method of claim 6, further comprising the steps of:

receiving said one or more data transport blocks with TFI at a medium access control (MAC) layer of said UE;

extracting said PDUs from said transport blocks at a segmentation/reassembly layer of said UE; and providing said fixed-size data SDUs to a layer of said UE above said segmentation/reassembly layer.

8. Method for handling fixed-size service data units (SDUs) in an uplink from a user equipment (UE) of a mobile telecommunications system via an interface to a radio access network (RAN) and from the RAN via an interface to a core network (CN) of said system, comprising the steps of:

storing plural SDUs at a segmentation/reassembly layer in said UE, each SDU provided in a minimum interleaving period in a transparent mode;

retrieving said stored plural SDUs and providing said retrieved plural SDUs in one or more protocol data units (PDUs) in one or more transport blocks; and providing said one or more transport blocks with a transport format indicator (TFI) for transmission over a radio interface from said UE to said RAN in a transmission time interval (TTI) having a duration greater than said minimum interleaving period.

9. The method of claim 8, further comprising the steps of:

receiving said one or more transport blocks with TFI at a medium access control (MAC) layer of said RAN;

extracting said PDUs from said transport blocks at said MAC layer of said RAN;

providing said PDUs from said MAC layer of said RAN to a segmentation/reassembly layer of said RAN;

storing said PDUs at said segmentation/reassembly layer of said RAN;

extracting said fixed-size SDUs from said stored PDUs; and providing said fixed-size SDUs from said RAN to said CN over said interface to the CN.

10. Apparatus for use in establishing a radio bearer (RB) relating to a request from a core network (CN) to a radio access network (RAN) in a mobile telecommunications system (UMTS), comprising:

means for determining (220) that a requested mode for an interface between said CN and said RAN is a transparent mode and for signaling (223) a segmentation state indicator to a segmentation/reassembly layer of said RAN; and means (234) responsive to said segmentation state indicator, for blocking segmentation in said segmentation/reassembly layer of said RAN for said RB in case said indicator indicates an inactive segmentation state and for permitting (108) segmentation in said segmentation/reassembly layer of said RAN in case said indicator indicates an active segmentation state.

11. The apparatus of claim 10, in case said segmentation is blocked in said RAN for an RB downlink, further comprising:

means for storing (178) plural service data units (SDUs) under the control of the segmentation/reassembly layer in said RAN, each SDU provided from the CN in a minimum interleaving period in said transparent mode and for providing (180) said stored plural SDUs in one or more protocol data units (PDUs) in one or more data transport blocks; and means for providing (182, 238) said one or more data transport blocks with a transport format indicator (TFI) for transmission over a radio interface from said RAN to a user equipment (UE) in a transmission time interval (TTI) having a duration greater than said minimum interleaving period.

12. The apparatus of claim 11, further comprising:

means for receiving (256) said PDUs from said transport blocks at a medium access control (MAC) layer of said UE; and means at a segmentation/reassembly layer of said UE (260) responsive to said PDUs from said MAC layer, for providing said fixed-size data SDUs to a layer of said UE above said segmentation/reassembly layer.

13. The apparatus of claim 10, in case said segmentation is blocked in said RAN for an RB uplink, further comprising:

means (280) for storing plural service data units (SDUs) at a segmentation/reassembly layer in said UE, each SDU provided (278) in a minimum interleaving period in said transparent mode and for retrieving said stored plural SDUs for providing (306) said retrieved plural SDUs in one or more protocol data units (PDUs) in one or more transport blocks; and means (310) for providing (312, 314) said one or more transport blocks with a transport format indicator (TFI) for transmission over a radio interface from said UE to said RAN in a transmission time interval (TTI) having a duration greater than said minimum interleaving period.

14. The apparatus of claim 13, further comprising:

means (328) for receiving said one or more transport blocks with TFI at a medium access control (MAC) layer of said RAN for extracting said PDUs from said transport blocks at said MAC layer of said RAN, and for providing (324) said PDUs from said MAC layer of said RAN to a segmentation/reassembly layer of said RAN; and means (326) for storing said PDUs at said segmentation/reassembly layer of said RAN for extracting said fixed-size SDUs from said stored PDUs and for providing (334, 336) said fixed-size SDUs from said RAN to said CN over said interface between said RAN and said CN.

15. Apparatus for handling fixed-size service data units (SDUs) in a downlink from a core network of a mobile telecommunications system by a radio access network (RAN) of said system, comprising:

means (234) for storing plural SDUs at a segmentation/reassembly layer in said RAN, each SDU provided in a minimum interleaving period in a transparent mode for retrieving said stored plural SDUs and for providing said retrieved plural SDUs in one or more protocol data units (PDUs) in one or more data transport blocks; and means (238) for providing said one or more data transport blocks with a transport format indicator (TFI) for transmission over a radio interface from said RAN to a user equipment (UE) in a transmission time interval (TTI) having a duration greater than said minimum interleaving period.

16. The apparatus of claim 15, further comprising:

means (256) for receiving said one or more data transport blocks with TFI at a medium access control (MAC) layer of said UE; and means (260) for extracting said PDUs from said transport blocks at a segmentation/reassembly layer of said UE and for providing said fixed-size data SDUs to a layer (L3) of said UE above said segmentation/reassembly layer.

17. Apparatus for handling fixed-size service data units (SDUs) in an uplink from a user equipment (UE) of a mobile telecommunications system via a radio interface (320) to a radio access network (RAN) and from the RAN via an interface (333) to a core network (CN) of said system, comprising:

means (280) for storing plural SDUs at a segmentation/reassembly layer in said UE, each SDU provided in a minimum interleaving period in a transparent mode for retrieving said stored plural SDUs and providing said retrieved plural SDUs in one or more protocol data units (PDUs) in one or more transport blocks; and means (310) for providing said one or more transport blocks with a transport format indicator (TFI) for transmission over said radio interface from said UE to said RAN in a transmission time interval (TTI) having a duration greater than said minimum interleaving period.

18. The apparatus of claim 17, further comprising:

means (328) for receiving said one or more transport blocks with TFI at a medium access control (MAC) layer of said RAN for extracting said PDUs from said transport blocks at said MAC layer of said RAN and for providing said PDUs from said MAC layer of said RAN to a segmentation/reassembly layer of said RAN; and means (326) for storing said PDUs at said segmentation/reassembly layer of said RAN for extracting said fixed-size SDUs from said stored PDUs and for providing said fixed-size SDUs from said RAN to said CN over said interface from said RAN to said CN.

* * * * *